US007650264B2

(12) United States Patent
Kodosky et al.

(10) Patent No.: US 7,650,264 B2
(45) Date of Patent: *Jan. 19, 2010

(54) IMPLEMENTING A GRAPHICAL PROGRAM ON A PROGRAMMABLE HARDWARE ELEMENT TO CONFIGURE AN INSTRUMENT TO PERFORM A MEASUREMENT FUNCTION

(75) Inventors: Jeffrey L. Kodosky, Austin, TX (US); Hugo Andrade, Austin, TX (US); Brian K. Odom, Pflugerville, TX (US); Cary P. Butler, Austin, TX (US)

(73) Assignee: National Instruments Corporation, Austin, TX (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/751,759

(22) Filed: May 22, 2007

(65) Prior Publication Data

US 2007/0225954 A1 Sep. 27, 2007

Related U.S. Application Data

(63) Continuation of application No. 11/566,782, filed on Dec. 5, 2006, now Pat. No. 7,558,711, which is a continuation of application No. 11/214,224, filed on Aug. 29, 2005, now Pat. No. 7,177,786, which is a continuation of application No. 10/435,584, filed on May 9, 2003, now Pat. No. 6,961,686, which is a continuation of application No. 09/788,104, filed on Feb. 16, 2001, now Pat. No. 6,934,667, which is a continuation of application No. 08/912,427, filed on Aug. 18, 1997, now Pat. No. 6,219,628.

(51) Int. Cl.
*G06F 7/60* (2006.01)
(52) U.S. Cl. .............................. 703/2; 703/22; 702/57; 717/106; 717/140

(58) Field of Classification Search ................ 703/2, 703/22; 717/106, 125, 140; 702/57, 119, 702/119.57, 123, 127; 716/1, 16–18; 345/700, 345/711
See application file for complete search history.

(56) References Cited

U.S. PATENT DOCUMENTS 6,044,211 A 3/2000 Jain

OTHER PUBLICATIONS

"Signal ProcessingWorkSystem, Hardware Design System User's Guide"; May 1996; 10 pages; Alta Group of Cadence Design Systems, Inc.
"Signal ProcessingWorkSystem, Designer/BDE User's Guide"; Feb. 1996; 2 pages; Alta Group of Cadence Design Systems, Inc.
"Signal ProcessingWorkSystem, HDS Library Reference"; May 1996; 6 pages; Alta Group of Cadence Design Systems, Inc.

*Primary Examiner*—Russell Frejd
(74) *Attorney, Agent, or Firm*—Meyertons Hood Kivlin Kowert & Goetzel, P.C.; Jeffrey C. Hood

(57) ABSTRACT

A computer-implemented system and method for generating a hardware implementation of graphical code. The method comprises first creating a graphical program. A first portion of the graphical program may optionally be compiled into machine code for execution by a CPU. A second portion of the graphical program is converted into a hardware implementation according to the present invention. The operation of converting the graphical program into a hardware implementation comprises exporting the second portion of the graphical program into a hardware description, wherein the hardware description describes a hardware implementation of the second portion of the graphical program, and then configuring a programmable hardware element utilizing the hardware description to produce a configured hardware element. The configured hardware element thus implements a hardware implementation of the second portion of the graphical program.

59 Claims, 25 Drawing Sheets

S#K example1.vi
Connector Pane

Front Panel
Controls and Indicators
Block Diagram
environment

IMPLEMENTING A GRAPHICAL PROGRAM ON A PROGRAMMABLE HARDWARE ELEMENT TO CONFIGURE AN INSTRUMENT TO PERFORM A MEASUREMENT FUNCTION

CONTINUATION DATA

This application is a continuation of U.S. patent application Ser. No. 11/566,782 filed Dec. 5, 2006 and titled "Generating a Hardware Description of a Block Diagram Model for Implementation on Programmable Hardware", which issued as U.S. Pat. No. 7,558,711 on Jul. 7, 2009, which is a continuation of U.S. patent application Ser. No. 11/214,224 filed Aug. 29, 2005 and titled "Implementing a Model on Programmable Hardware", which issued as U.S. Pat. No. 7,177,786 on Feb. 13, 2007, which is a continuation of U.S. patent application Ser. No. 10/435,584 filed May 9, 2003 and titled "Specifying and Targeting Portions of a Graphical Program for Real-time Response", which issued as U.S. Pat. No. 6,961,686 on Nov. 1, 2005, and which is a continuation of U.S. patent application Ser. No. 09/788,104 filed on Feb. 16, 2001 titled "System and Method for Configuring a Device to Perform Measurement Functions Utilizing Conversion of Graphical Programs into Hardware Implementations", whose inventors are Jeffrey L. Kodosky, Hugo Andrade, Brian Keith Odom and Cary Paul Butler, which issued as U.S. Pat. No. 6,934,667 on Aug. 23, 2005, and which is a continuation of U.S. patent application Ser. No. 08/912,427 filed on Mar. 22, 2000 titled "System and Method for Converting Graphical Programs Into Hardware Implementations", whose inventors are Jeffrey L. Kodosky, Hugo Andrade, Brian Keith Odom and Cary Paul Butler, which issued as U.S. Pat. No. 6,219,628 on Apr. 17, 2001, and which is a Continued Prosecution Application of U.S. patent application Ser. No. 08/912,427 filed on Aug. 18, 1997 titled "System and Method for Converting Graphical Programs Into Hardware Implementations", whose inventors are Jeffrey L. Kodosky, Hugo Andrade, Brian Keith Odom and Cary Paul Butler.

INCORPORATION BY REFERENCE

Appendices I and II are included as Computer Program Listing Appendices electronically submitted to the USPTO and are hereby incorporated by reference in their entirety as though fully and completely set forth herein.

U.S. patent application Ser. No. 08/912,427 filed on Mar. 22, 2000 titled "System and Method for Converting Graphical Programs Into Hardware Implementations", whose inventors are Jeffrey L. Kodosky, Hugo Andrade, Brian Keith Odom and Cary Paul Butler, which issued as U.S. Pat. No. 6,219,628 on Apr. 17, 2001, is hereby incorporated by reference in its entirety as though fully and completely set forth herein.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to graphical programming, and in particular to a system and method for converting a graphical program into a programmable hardware implementation.

DESCRIPTION OF THE RELATED ART

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, and industrial automation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. No. 4,901,221 to Kodosky et al discloses a graphical system and method for modeling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems, industrial automation systems and modeling processes, as well as for any type of general programming.

Therefore, Kodosky et al teaches a graphical programming environment wherein a user places on manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user preferably creates a front panel or user interface panel. The front panel includes various front panel objects, such as controls or indicators that represent the respective input and output that will be used by the graphical program or VI, and may include other icons which represent devices being controlled. When the controls and indicators are created in the front panel, corresponding icons or terminals are automatically created in the block diagram by the block diagram editor. Alternatively, the user can first place terminal icons in the block diagram which cause the display of corresponding front panel objects in the front panel. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user adjusts the controls on the front panel to affect the input and views the output on the respective indicators.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), and supervisory control and data acquisition (SCADA) applications, among others.

A primary goal of virtual instrumentation is to provide the user the maximum amount of flexibility to create his/her own applications and/or define his/her own instrument functionality. In this regard, it is desirable to extend the level at which the user of instrumentation or industrial automation hardware is able to program instrument. The evolution of the levels at which the user has been able to program an instrument is essentially as follows.

1. User level software (LabVIEW, LabWindows CVI, Visual Basic, etc.)
2. Kernel Level Software
3. Auxiliary kernel level software (a second kernel running along side the main OS, e.g., InTime, VentureCom, etc.)
4. Embedded kernel level software (U.S. patent application Ser. No. 08/912,445, referenced herein)
5. Hardware level software (FPGA—the present patent application)

In general, going down the above list, the user is able to create software applications which provide a more deterministic real-time response. Currently, most programming development tools for instrumentation or industrial automation provide an interface at level 1 above. In general, most users are unable and/or not allowed to program at the kernel level or auxiliary kernel level. The user level software typically takes the form of software tools that can be used to create software which operates at levels 1 and/or 4.

Current instrumentation solutions at level 5 primarily exist as vendor-defined solutions, i.e., vendor created modules. However, it would be highly desirable to provide the user with the ability to develop user level software which operates at the hardware level. More particularly, it would be desirable to provide the user with the ability to develop high level software, such as graphical programs, which can then be readily converted into hardware level instrument functionality. This would provide the user with the dual benefits of being able to program instrument functionality at the highest level possible (text-based or graphical programs), while also providing the ability to have the created program operate directly in hardware for increased speed and efficiency.

SUMMARY OF THE INVENTION

The present invention comprises a computer-implemented system and method for automatically generating hardware level functionality, e.g., programmable hardware or FPGAs, in response to a graphical program created by a user. This provides the user the ability to develop or define instrument functionality using graphical programming techniques, while enabling the resulting program to operate directly in hardware.

The user first creates a graphical program which performs or represents the desired functionality. The graphical program will typically include one or more modules or a hierarchy of sub-VIs. In the preferred embodiment, the user places various constructs in portions of the graphical program to aid in conversion of these portions into hardware form.

The user then selects an option to convert the graphical program into executable form, wherein at least a portion of the graphical program is converted into a hardware implementation. According to one embodiment of the present invention, the user can select which portions of modules are to be translated into hardware form, either during creation of the graphical program or when selecting the option to convert the graphical program into executable form. Thus the user can select a first portion of the graphical program, preferably comprising the supervisory control and display portion of the program, to be compiled into machine language for execution on a CPU. According to the present invention, the user can select a second portion of the graphical program which is desired for hardware implementation.

The portion of the graphical program selected for hardware implementation is first exported into a hardware description, such as a VHDL description. The hardware description is then converted into a net list, preferably an FPGA-specific net list. The hardware description is converted into a net list by a synthesis tool. The net list is then compiled into a FPGA program file, also called a software bit stream. In the preferred embodiment, the hardware description is directly converted into an FPGA program file.

The step of compiling the resulting net list into an FPGA program file preferably uses a library of pre-compiled function blocks to aid in the compilation, as well as hardware target specific information. The library of pre-compiled function blocks includes net list libraries for first nodes, such as for/next loops, while/do loops, case structures, and sequence structures, among others. This allows the user to program with high level programming constructs, such as iteration, looping, and case structures, while allowing the resulting program to execute directly in hardware.

The resulting bit stream is then transferred to an FPGA to produce a programmed FPGA equivalent to the graphical program or block diagram.

The preferred embodiment of the invention comprises a general purpose computer system which includes a CPU and memory, and an interface card or device coupled to the computer system which includes programmable hardware or logic, such as an FPGA. The computer system includes a graphical programming system which is used to develop the graphical program. The computer system also includes software according to the present invention which is operable to convert the graphical program into a hardware description. The computer system further includes a synthesis tool which is used to compile the hardware description into an FPGA-specific net list, as well as other tools for converting the net list into an FPGA program file for downloading into the FPGA. The computer system further includes a library of pre-compiled function blocks according to the present invention which are used by the synthesis tool to aid in compiling the net list into the software bit stream.

In one embodiment, the target device including the reconfigurable hardware or FPGA being programmed comprises an interface card in the computer system, such as a data acquisition card, a GPIB interface card, or a VXI interface card. In an alternate embodiment, the target device being programmed comprises an instrument or device connected to the computer, such as through a serial connection. It is noted that the target instrument or device being programmed, which includes an FPGA or other configurable hardware element, can take any of various forms, as desired.

BRIEF DESCRIPTION OF THE DRAWINGS

A better understanding of the present invention can be obtained when the following detailed description of the preferred embodiment is considered in conjunction with the following drawings, in which:

FIGS. 15 and 16 illustrate a simple example of operation of the present invention, wherein FIG. 15 illustrates a simple graphical program and FIG. 16 is a conceptual diagram of the hardware description of the graphical program of FIG. 15;

FIGS. 17-19 illustrate another example of operation of the present invention, wherein FIG. 17 illustrates a graphical program, FIG. 18 illustrates a tree of data structures created in response to the graphical program of FIG. 17, and FIG. 19 is a conceptual diagram of the hardware description of the graphical program of FIG. 17.

Figure 1:
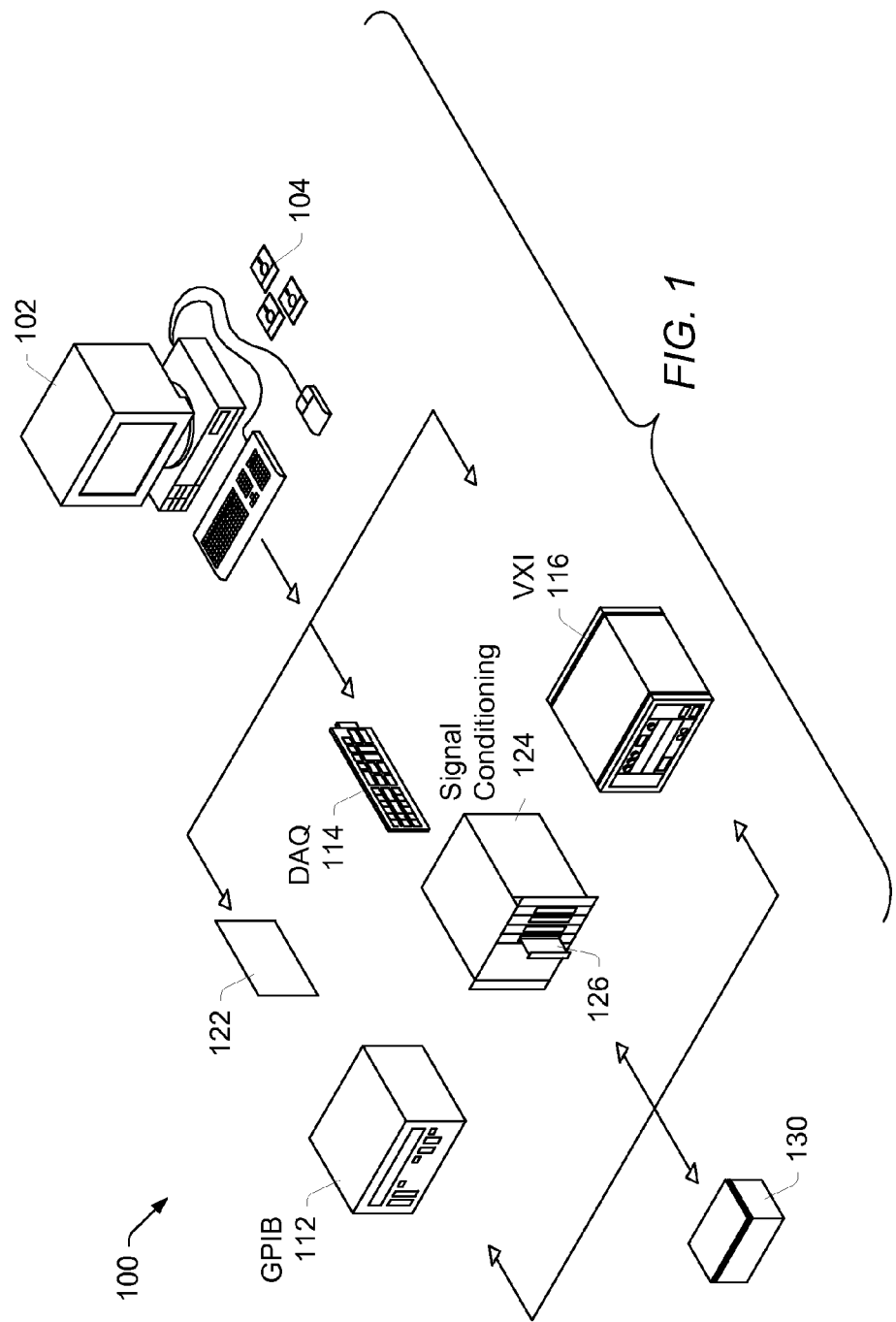
FIG. 1 illustrates an instrumentation control system.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following U.S. patents and patent applications are hereby incorporated by reference in their entirety as though fully and completely set forth herein.

U.S. Pat. No. 4,901,221 titled "Graphical System for Modeling a Process and Associated Method," issued on Feb. 13, 1990.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. patent application Ser. No. 08/292,091 filed Aug. 17, 1994, titled "Method and Apparatus for Providing Improved Type Compatibility and Data Structure Organization in a Graphical Data Flow Diagram", which issued as U.S. Pat. No. 5,734,863.

U.S. Pat. No. 5,475,851 titled "Method and Apparatus for Improved Local and Global Variable Capabilities in a Graphical Data Flow Program".

U.S. Pat. No. 5,497,500 titled "Method and Apparatus for More Efficient Function Synchronization in a Data Flow Program".

U.S. patent application Ser. No. 08/474,307 titled "Method and Apparatus for Providing Stricter Data Type Capabilities in a Graphical Data Flow Environment" filed Jun. 7, 1995, which issued as U.S. Pat. No. 5,821,934.

U.S. Pat. No. 5,481,740 titled "Method and Apparatus for Providing Autoprobe Features in a Graphical Data Flow Diagram".

U.S. patent application Ser. No. 08/870,262 titled "System and Method for Detecting Differences in Graphical Programs" filed Jun. 6, 1997, whose inventor is Ray Hsu, which issued as U.S. Pat. No. 5,974,254.

U.S. patent application Ser. No. 08/912,445 titled "Embedded Graphical Programming System" filed Aug. 18, 1997, whose inventors are Jeffrey L. Kodosky, Darshan Shah, Samson DeKey, and Steve Rogers, which issued as U.S. Pat. No. 6,173,438 on Jan. 9, 2001.

U.S. patent application Ser. No. 08/912,427 filed on Mar. 22, 2000 titled "System and Method for Converting Graphical Programs Into Hardware Implementations", whose inventors are Jeffrey L. Kodosky, Hugo Andrade, Brian Keith Odom and Cary Paul Butler, which issued as U.S. Pat. No. 6,219,628 on Apr. 17, 2001.

The above-referenced patents and patent applications disclose various aspects of the LabVIEW graphical programming and development system.

The LabVIEW and BridgeVIEW graphical programming manuals, including the "G Programming Reference Manual", available from National Instruments Corporation, are also hereby incorporated by reference in their entirety.

Figure 1A:
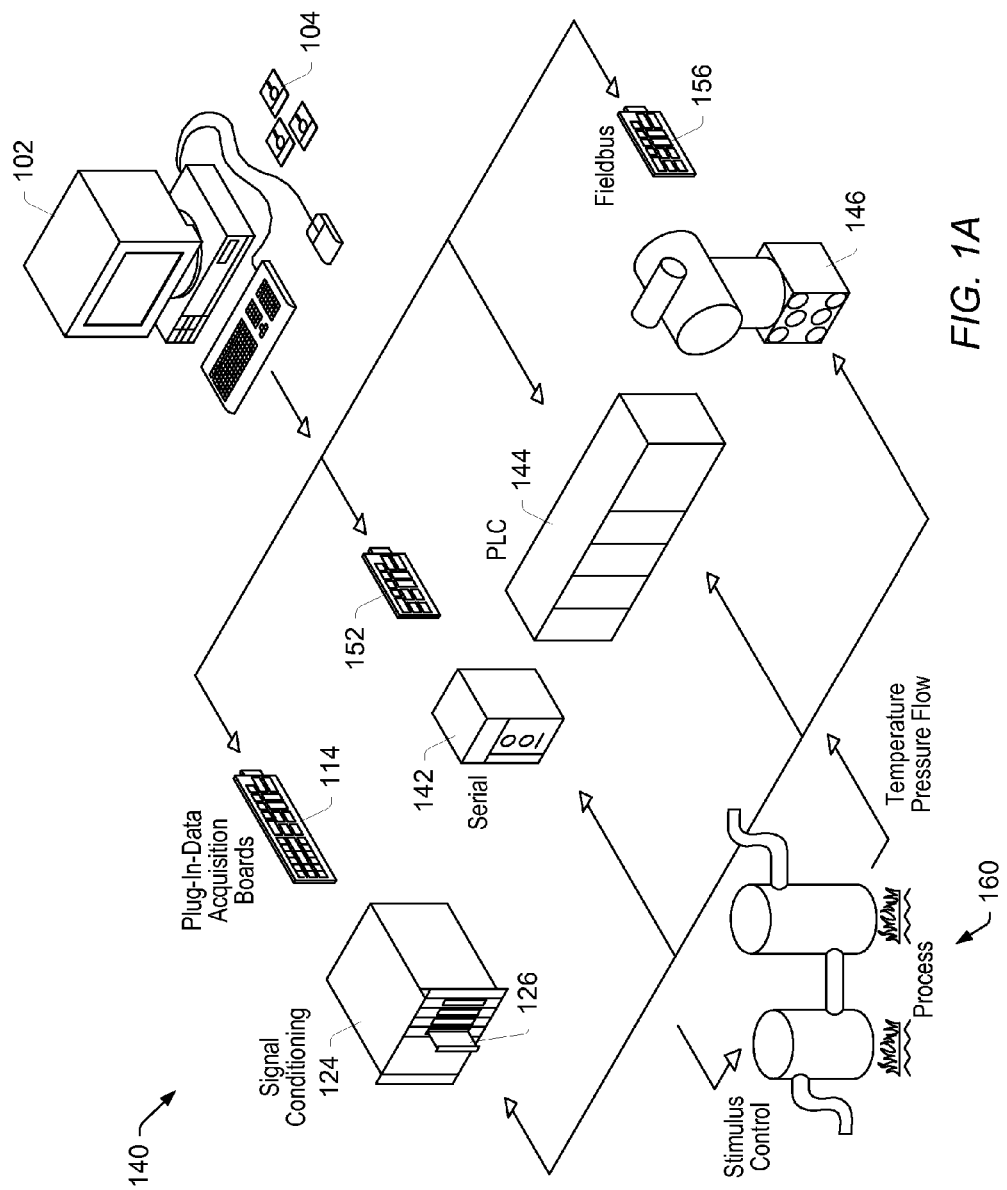
FIG. 1A illustrates an industrial automation system.

FIGS. 1 and 1A—Instrumentation and Industrial Automation Systems

Referring now to FIG. 1, an instrumentation control system 100 is shown. The system 100 comprises a computer 102 which connects to one or more instruments. The computer 102 comprises a CPU, a display screen, memory, and one or more input devices such as a mouse or keyboard as shown. The computer 102 connects through the one or more instruments to analyze, measure or control a unit under test (UUT) or process 130.

The one or more instruments may include a GPIB instrument 112, a data acquisition board 114, and/or a VXI instrument 116. The GPIB instrument 112 is coupled to the computer 102 via a GPIB interface card 122 provided by the computer 102. The data acquisition board 114 is coupled to the computer 102, and preferably interfaces through signal conditioning circuitry 124 to the UUT. The signal conditioning circuitry 124 preferably comprises an SCXI (Signal Conditioning eXtensions for Instrumentation) chassis comprising one or more SCXI modules 126. Both the GPIB card 122 and the DAQ card 114 are typically plugged in to an I/O slot in the computer 102, such as a PCI bus slot, a PC Card slot, or an ISA, EISA or MicroChannel bus slot provided by the computer 102. However, these cards 122 and 114 are shown external to computer 102 for illustrative purposes. The VXI instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown) comprised in the computer. A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

In the embodiment of FIG. 1, one or more of the devices connected to the computer 102 include programmable or reconfigurable hardware according to the present invention. For example, one or more of the GPIB card 122, the DAQ card 114, or the VXI card include programmable hardware according to the present invention. Alternatively, or in addition, one or more of the GPIB instrument 112, the VXI instrument 116, or the serial instrument include programmable hardware according to the present invention. In the preferred embodiment, the programmable hardware comprises an FPGA (field programmable gate array).

The instruments are coupled to the unit under test (UUT) or process 130, or are coupled to receive field signals, typically generated by transducers. The system 100 may be used in a data acquisition and control application, in a test and measurement application, a process control application, or a man-machine interface application.

Referring now to FIG. 1A, an industrial automation system 140 is shown. The industrial automation system 140 is similar to the instrumentation or test and measurement system 100 shown in FIG. 1. Elements which are similar or identical to elements in FIG. 1 have the same reference numerals for convenience. The system 140 comprises a computer 102 which connects to one or more devices or instruments. The computer 102 comprises a CPU, a display screen, memory, and one or more input devices such as a mouse or keyboard as shown. The computer 102 connects through the one or more devices to a process or device 160 to perform an automation function, such as MMI (Man Machine Interface), SCADA (Supervisory Control and Data Acquisition), portable or distributed acquisition, advanced analysis, or control.

The one or more devices may include a data acquisition board 114, a serial instrument 142, a PLC (Programmable Logic Controller) 144, or a fieldbus network card 156. The data acquisition board 114 is coupled to or comprised in the computer 102, and preferably interfaces through signal conditioning circuitry 124 to the process 160. The signal conditioning circuitry 124 preferably comprises an SCXI (Signal Conditioning extensions for Instrumentation) chassis comprising one or more SCXI modules 126. The serial instrument 142 is coupled to the computer 102 through a serial interface card 152, or through a serial port, such as an RS-232 port, provided by the computer 102. The PLC 144 couples to the computer 102 through a serial port, Ethernet port, or a proprietary interface. The fieldbus interface card 156 is preferably comprised in the computer 102 and interfaces through a fieldbus network to one or more fieldbus devices, such as valve 146. Each of the DAQ card 114, the serial card 152 and the fieldbus card 156 are typically plugged in to an I/O slot in the computer 102 as described above. However, these cards 114, 12 and 156 are shown external to computer 102 for illustrative purposes. In typical industrial automation systems a device will not be present of each interface type, and in fact many systems may only have one or more devices of a single interface type, such as only PLCs. The devices are coupled to the device or process 160.

In the embodiment of FIG. 1A, one or more of the devices connected to the computer 102 include programmable hardware according to the present invention. For example, one or more of the data acquisition board 114, the serial instrument 142, the serial interface card 152, the PLC 144, or the fieldbus network card 156 include programmable hardware according to the present invention. In the preferred embodiment, the programmable hardware comprises an FPGA (field programmable gate array).

Referring again to FIGS. 1 and 1A, the computer 102 preferably includes a memory media, such as a magnetic media, CD-ROM, or floppy disks 104. The memory media preferably stores a graphical programming development system for developing graphical programs. The memory media also stores computer programs according to the present invention which are executable to convert at least a portion of a graphical program into a form for configuring or programming the programmable hardware or FPGA. The present invention includes a software program stored on a memory and/or hard drive of the computer 102 and executed by a CPU of the computer 102. The CPU executing code and data from the memory thus comprises a means for converting graphical code into a hardware implementation according to the steps described below.

The instruments or devices in FIGS. 1 and 1A are controlled by graphical software programs, optionally a portion of which execute on the CPU of the computer 102, and at least a portion of which are downloaded to the programmable hardware for hardware execution. The graphical software programs which perform data acquisition, analysis and/or presentation, e.g., for instrumentation control or industrial automation, are referred to as virtual instruments.

In the preferred embodiment, the present invention is comprised in the LabVIEW or BridgeVIEW graphical programming systems, hereafter collectively referred to as LabVIEW, available from National Instruments. Also, in the preferred embodiment, the term "LabVIEW" is intended to include graphical programming systems which include G programming functionality, i.e., which include at least a portion of LabVIEW graphical programming functionality, including the BridgeVIEW graphical programming system.

Also, the term "graphical programming system" is intended to include any of various types of systems which are used to develop or create graphical code or graphical programs, including LabVIEW and BridgeVIEW from National Instruments, Visual Designer from Intelligent Instrumentation, Hewlett-Packard's VEE (Visual Engineering Environment), Snap-Master by HEM Data Corporation, DASYLab by DasyTec, GFS DiaDem, and ObjectBench by SES (Scientific and Engineering Software), among others.

Although in the preferred embodiment the graphical programs and programmable hardware are involved with data acquisition/generation, analysis, and/or display, and for controlling or modeling instrumentation or industrial automation hardware, it is noted that the present invention can be used to create hardware implementations of graphical programs for a plethora of applications and are not limited to instrumentation or industrial automation applications. In other words, FIGS. 1 and 1A are exemplary only, and the present invention may be used in any of various types of systems. Thus, the system and method of the present invention is operable for automatically creating hardware implementations of graphical programs or graphical code for any of various types of applications, including general purpose software applications such as word processing, spreadsheets, network control, games, etc.

Computer Block Diagram

Figure 2:
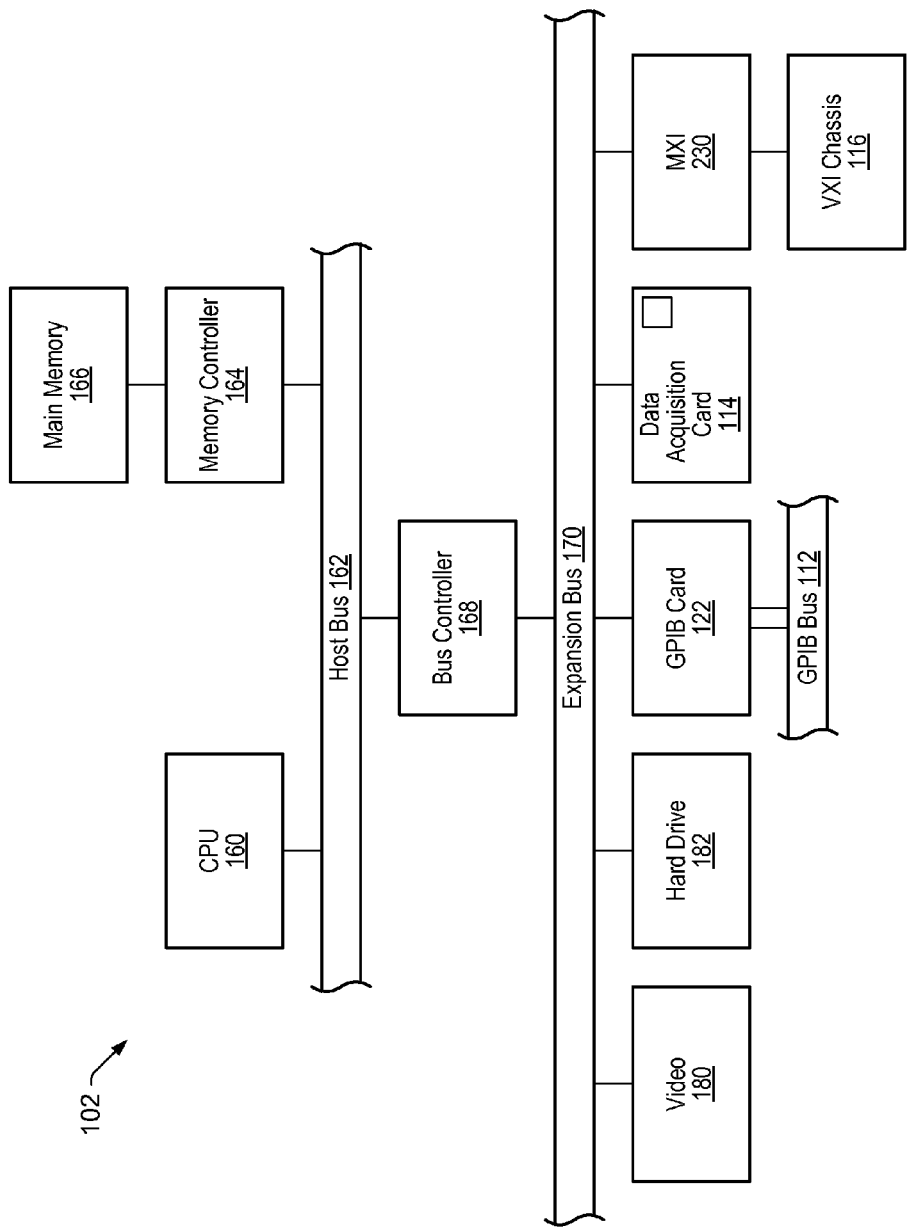
FIG. 2 is a block diagram of the instrumentation control system of FIG. 1.

Referring now to FIG. 2, a block diagram of the computer 102 (of FIG. 1) is shown. The elements of a computer not necessary to understand the operation of the present invention have been omitted for simplicity. The computer 102 includes at least one central processing unit or CPU 160 which is coupled to a processor or host bus 162. The CPU 160 may be any of various types, including an x86 processor, a PowerPC processor, a CPU from the Motorola family of processors, a CPU from the SPARC family of RISC processors, as well as others. Main memory 166 is coupled to the host bus 162 by means of memory controller 164. The main memory 166 stores a graphical programming system, and also stores software for converting at least a portion of a graphical program into a hardware implementation. This software will be discussed in more detail below. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1), a GPIB interface card 122 which provides a GPIB bus interface to the GPIB instrument 112 (of FIG. 1), and a VXI or MXI bus card 230 coupled to the VXI chassis 116 for receiving VXI instruments. The computer 102 further comprises a video display subsystem 180 and hard drive 182 coupled to the expansion bus 170.

One or more of the interface cards or devices coupled to the expansion bus, such as the DAQ card 114, the GPIB interface card 122, the GPIB instrument 112, or the VXI or MXI bus card 230 comprises an embedded system comprising an embedded CPU and embedded memory.

Programmable Hardware Diagram

Figure 3:
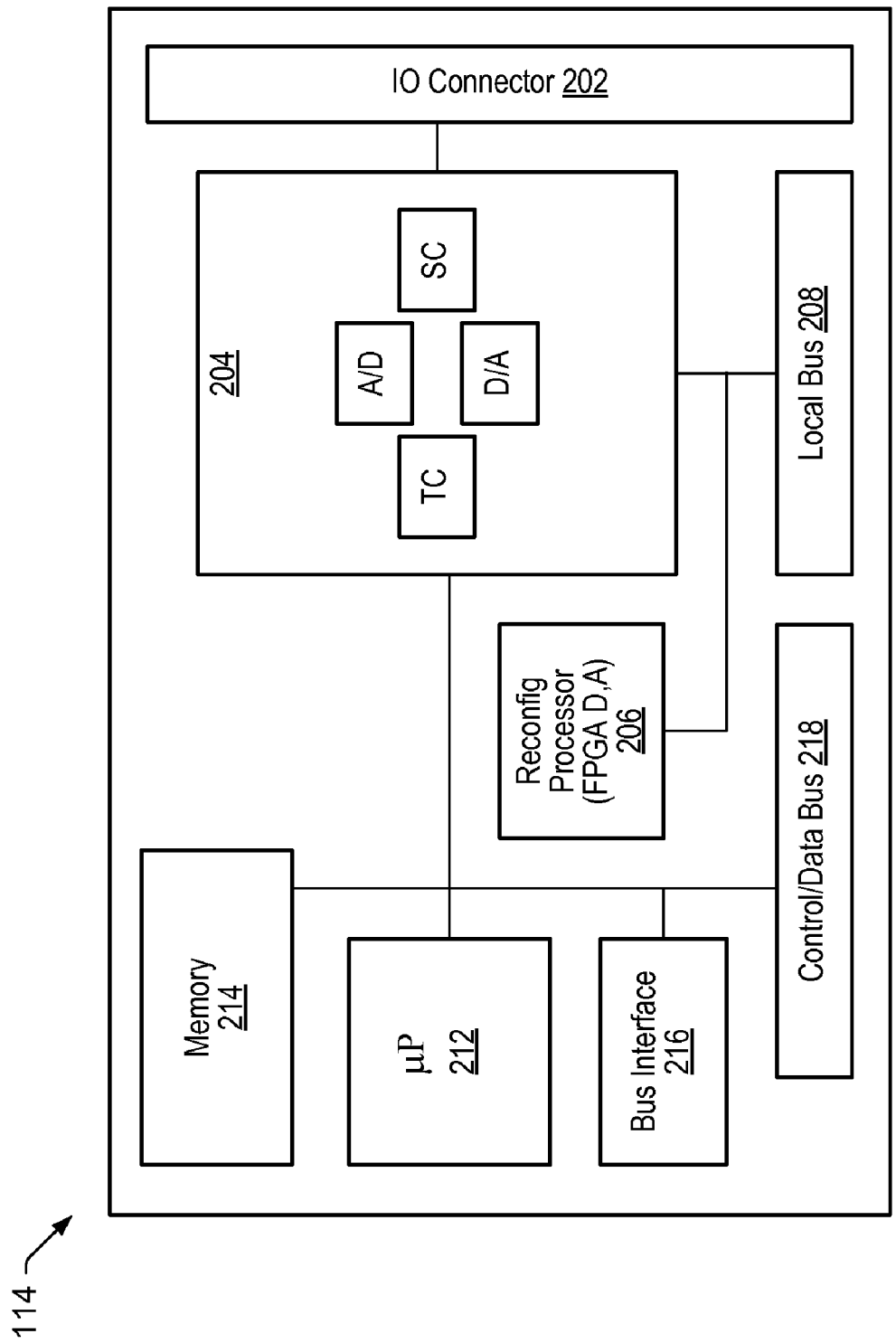
FIGS. 3, 3A and 3B are block diagrams illustrating an interface card configured with programmable hardware according to various embodiments of the present invention.

Referring now to FIG. 3, a block diagram illustrating an interface card configured with programmable hardware according to the present invention is shown. It is noted that FIG. 3 is exemplary only, and an interface card or device configured with programmable hardware according to the present invention may have various architectures or forms, as desired. The interface card illustrated in FIG. 3 is the DAQ interface card 114 shown in either of FIG. 1 or 1A. However, as noted above, the programmable hardware may be included on any of the various devices shown in FIG. 1 or 1A, or on other devices, as desired.

As shown, the interface card 114 includes an I/O connector 202 which is coupled for receiving signals. In the embodiments of FIGS. 1 and 1A, the I/O connector 202 presents analog and/or digital connections for receiving/providing analog or digital signals. The I/O connector 202 is adapted for coupling to SCXI conditioning logic 124 and 126, or is adapted to be coupled directly to a unit under test 130 or process 160.

The interface card 114 also includes data acquisition (DAQ) logic 204. As shown, the data acquisition logic 204 comprises analog to digital (A/D) converters, digital to analog (D/A) converters, timer counters (TC) and signal conditioning (SC) logic as shown. The DAQ logic 204 provides the data acquisition functionality of the DAQ card 114.

According to the preferred embodiment of the invention, the interface card 114 includes a programmable hardware element or programmable processor 206. In the preferred embodiment, the programmable hardware 206 comprises a field programmable gate array (FPGA) such as those available from Xilinx, Altera, etc. The programmable hardware element 206 is coupled to the DAQ logic 204 and is also coupled to the local bus interface 208. Thus a graphical program can be created on the computer 102, or on another computer in a networked system, and at least a portion of the graphical program can be converted into a hardware implementation form for execution in the FPGA 206. The portion of the graphical program converted into a hardware implementation form is preferably a portion which requires fast and/or real-time execution.

In the embodiment of FIG. 3, the interface card 114 further includes a dedicated on-board microprocessor 212 and memory 214. This enables a portion of the graphical program to be compiled into machine language for storage in the memory 214 and execution by the microprocessor 212. This is in addition to a portion of the graphical program being converted into a hardware implementation form in the FPGA 206. Thus, in one embodiment, after a graphical program has been created, a portion of the graphical program is compiled for execution on the embedded CPU 212 and executes locally on the interface card 114 via the CPU 212 and memory 214, and a second portion of the graphical program is translated or converted into a hardware executable format and downloaded to the FPGA 206 for hardware implementation.

As shown, the interface card 114 further includes bus interface logic 216 and a control/data bus 218. In the preferred embodiment, the interface card 114 is a PCI bus-compliant interface card adapted for coupling to the PCI bus of the host computer 102, or adapted for coupling to a PXI (PCI eXtensions for Instrumentation) bus. The bus interface logic 216 and the control/data bus 218 thus present a PCI or PXI interface.

The interface card 114 also includes local bus interface logic 208. In the preferred embodiment, the local bus interface logic 208 presents a RTSI (Real Time System Integration) bus for routing timing and trigger signals between the interface card 114 and one or more other devices or cards.

Figure 3A:
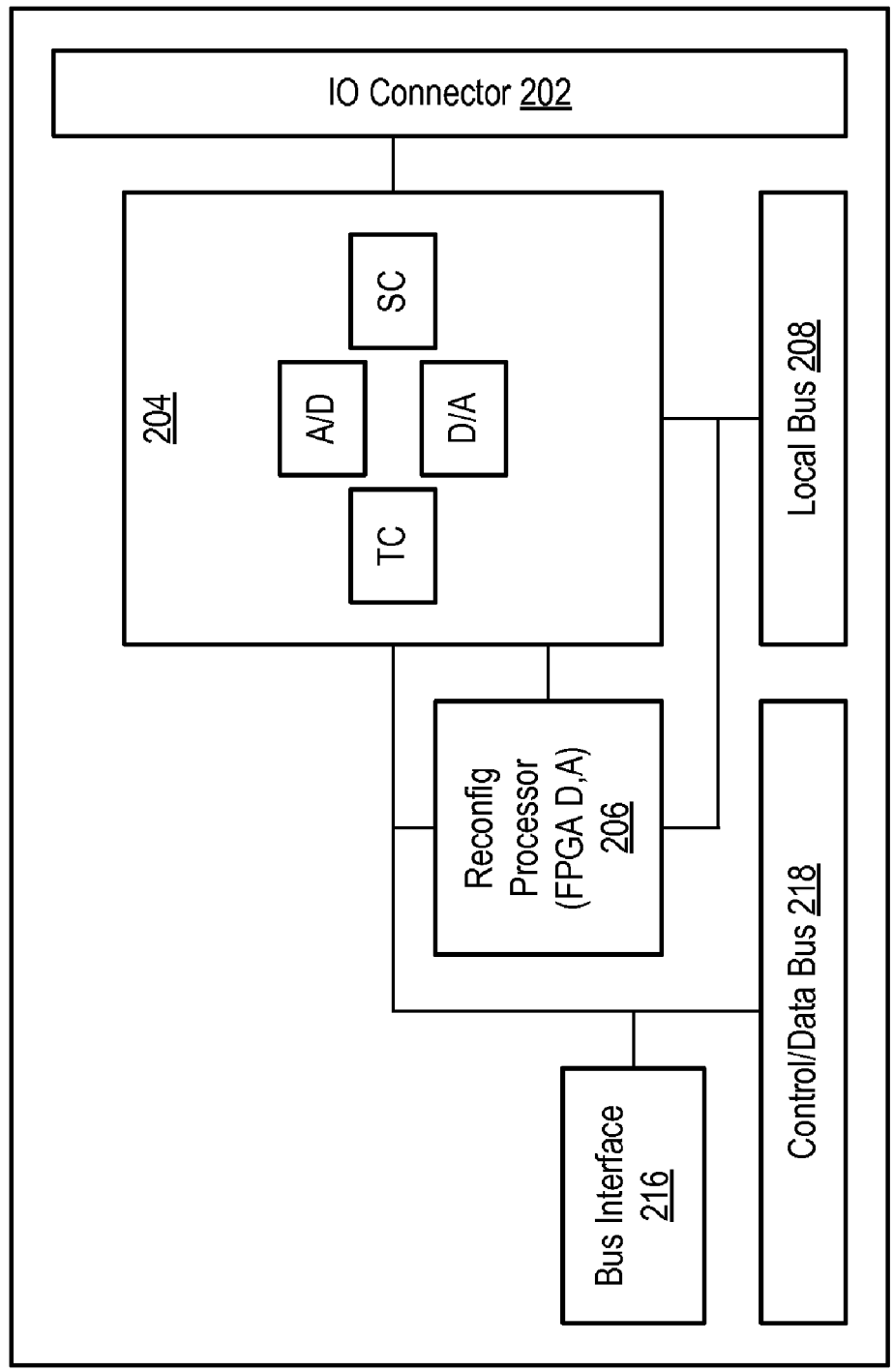

In the embodiment of FIG. 3A, the CPU 212 and memory 214 are not included on the interface card 114, and thus only the portion of the graphical program which is converted into hardware implementation form is downloaded to the FPGA 206. Thus in the embodiment of FIG. 3A, any supervisory control portion of the graphical program which is necessary or desired to execute in machine language on a programmable CPU is executed by the host CPU in the computer system 102, and is not executed locally by a CPU on the interface card 114.

Figure 3B:
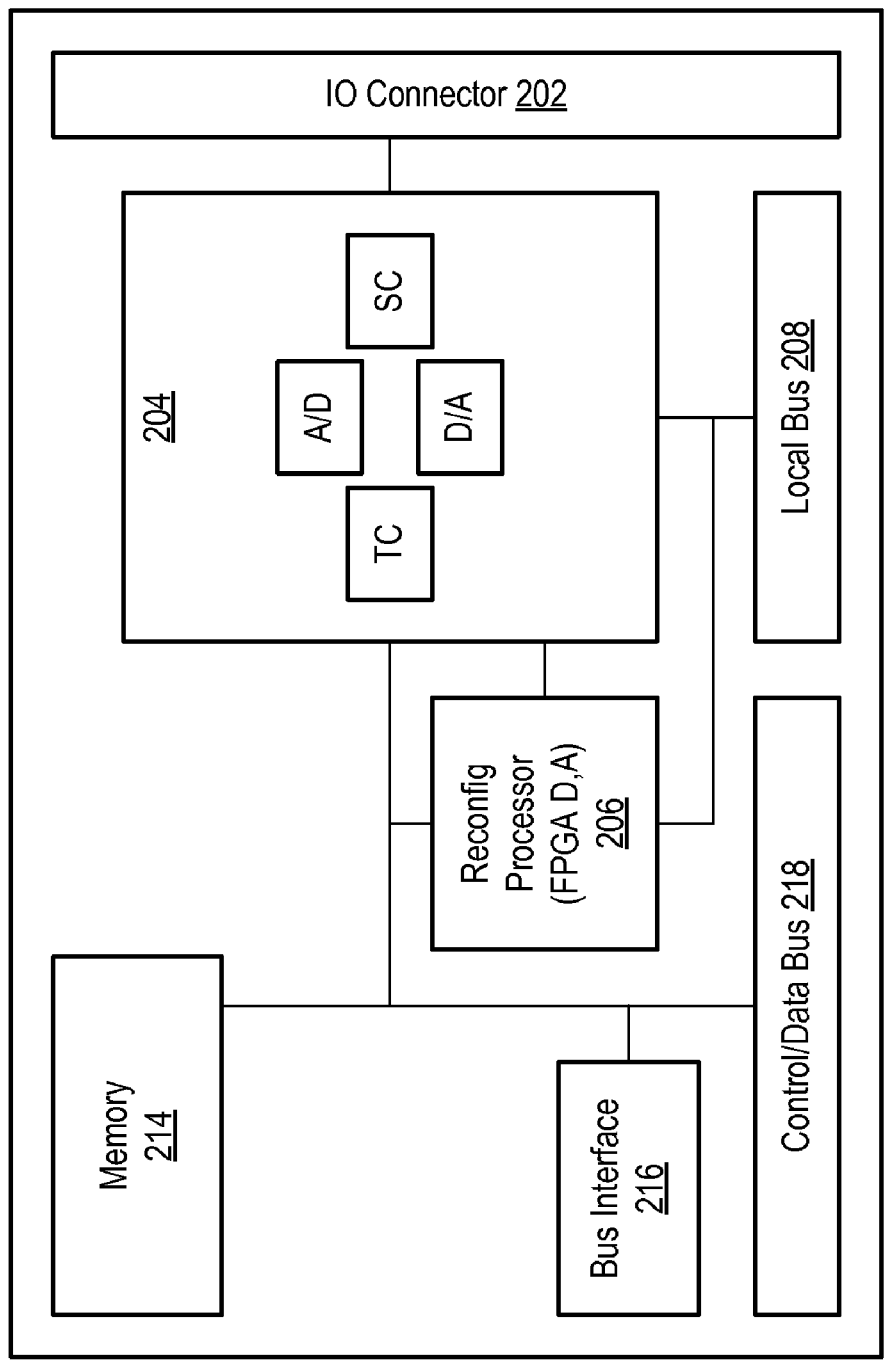

In the embodiment of FIG. 3B, the CPU 212 is not included on the interface card 114, i.e., the interface card 114 includes the FPGA 206 and the memory 214. In this embodiment, the memory 214 is used for storing FPGA state information. FIG. 3B is the currently preferred embodiment of the present invention.

Figure 4:
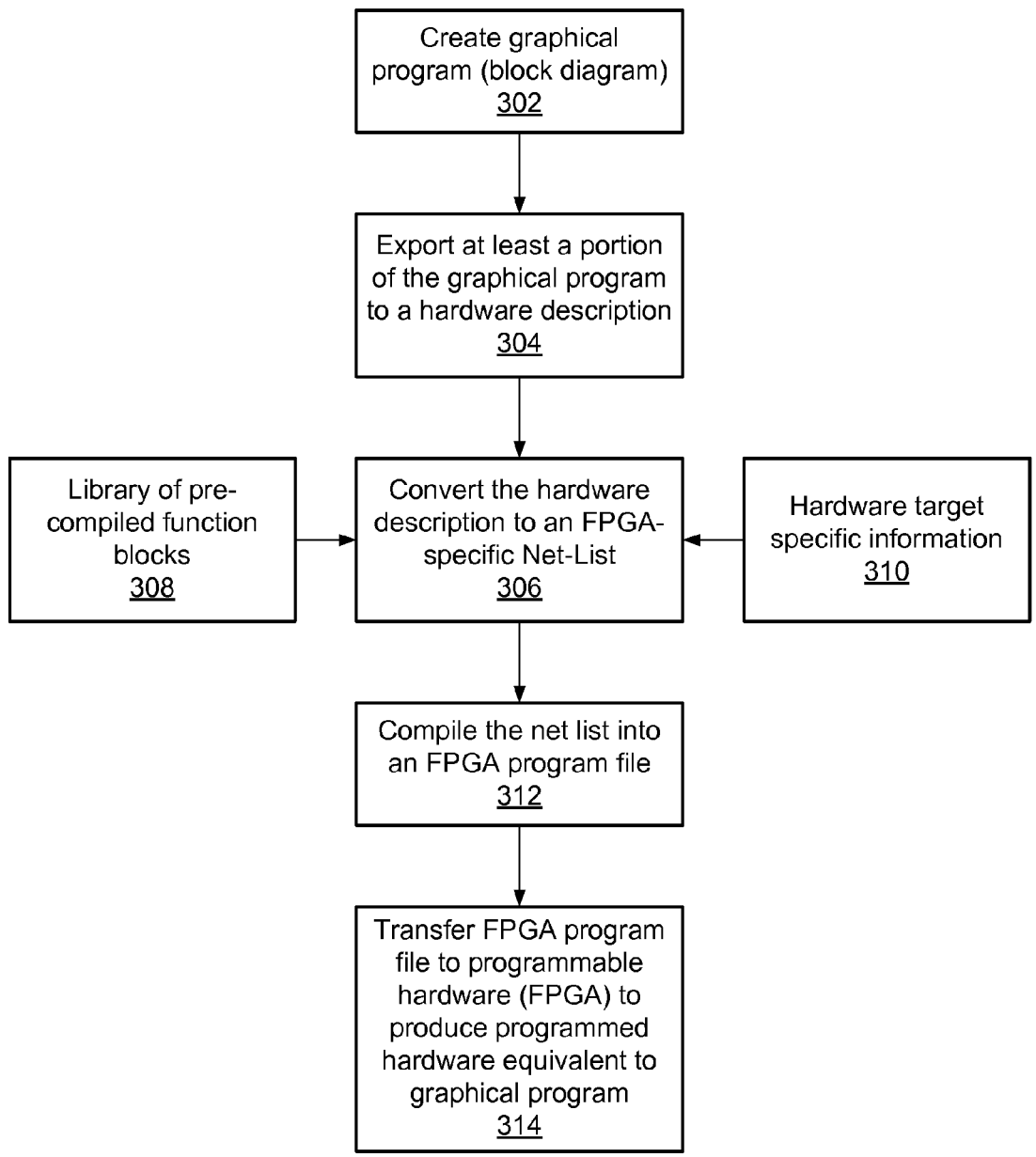
FIG. 4 is a flowchart diagram illustrating operation of the present invention.

FIG. 4—Conversion of Graphical Code into a Hardware Implementation

Referring now to FIG. 4, a flowchart diagram is shown illustrating operation of the preferred embodiment of the present invention. The present invention comprises a computer-implemented method for generating hardware implementations of graphical programs or graphical code. It is noted that various of the steps in the flowcharts below can occur concurrently or in different orders.

The method below presumes that a graphical programming development system is stored in the memory of the computer system for creation of graphical programs. In the preferred embodiment, the graphical programming system is the LabVIEW graphical programming system available from National Instruments. In this system, the user creates the graphical program in a graphical program panel, referred to as a block diagram window and also creates a user interface in a graphical front panel. The graphical program is sometimes referred to as a virtual instrument (VI). The graphical program or VI will typically have a hierarchy of sub-graphical programs or sub-VIs.

As shown, in step 302 the user first creates a graphical program, also sometimes referred to as a block diagram. In the preferred embodiment, the graphical program comprises a graphical data flow diagram which specifies functionality of the program to be performed. This graphical data flow diagram is preferably directly compilable into machine language code for execution on a computer system.

In step 304 the method operates to export at least a portion of the graphical program to a hardware description. Thus, after the user has created a graphical program in step 302, the user selects an option to export a portion of the graphical program to a hardware description. The hardware description is preferably a VHDL description, e.g., a VHDL source file, or alternatively is a high level net list description. The hardware description comprises a high level hardware description of function blocks, logic, inputs, and outputs which perform the operation indicated by the graphical program. The operation of exporting at least a portion of a the graphical program to a hardware description is discussed in more detail with the flowchart of FIG. 6.

In one embodiment, during creation of the graphical program in step 302 the user specifies portions, e.g. sub VIs, which are to be exported to the hardware description format for conversion into hardware implementation. In another embodiment, when the user selects the option to export a portion of the graphical program to the hardware description format, the user selects which modules or sub-VIs at that time which are to be exported to the hardware description.

In step 306 the method operates to convert the hardware description into an FPGA-specific net list. The net list describes the components required to be present in the hardware as well as their interconnections. Conversion of the hardware description into the FPGA-specific net list is preferably performed by any of various types of commercially available synthesis tools, such as those available from Xilinx, Altera, etc.

In the preferred embodiment, the converting step 306 may utilize one or more pre-compiled function blocks from a library of pre-compiled function blocks 308. Thus, for certain function blocks which are difficult to compile, or less efficient to compile, from a hardware description into a net list format, the hardware description created in step 304 includes a reference to a pre-compiled function block from the library 308. The respective pre-compiled function blocks are simply inserted into the net list in place of these references in step 306. The preferred embodiment of the invention thus includes the library 308 of pre-compiled function blocks which are used in creating the net list. The preferred embodiment also includes hardware target specific information 310 which is used by step 306 in converting the hardware description into a net list which is specific to a certain type or class of FPGA.

In step 312 the method operates to compile the net list into an FPGA program file, also referred to as a software bit stream. The FPGA program file is a file that can be readily downloaded to program an FPGA.

After the net list has been compiled into an FPGA program file in step 312, then in step 314 the method operates to transfer the FPGA program file to the programmable hardware, e.g., the FPGA, to produce a programmed hardware equivalent to the graphical program. Thus, upon completion of step 314, the portion of a graphical program referenced in step 304 is comprised as a hardware implementation in an FPGA or other programmable hardware element.

It is noted that various of the above steps can be combined and/or can be made to appear invisible to the user. For example, steps 306 and 312 can be combined into a single step, as can steps 304 and 306. In the preferred embodiment, after the user creates the graphical program in step 302, the user simply selects a hardware export option and indicates the hardware target or destination, causing steps 304-314 to be automatically performed.

Figure 4A:
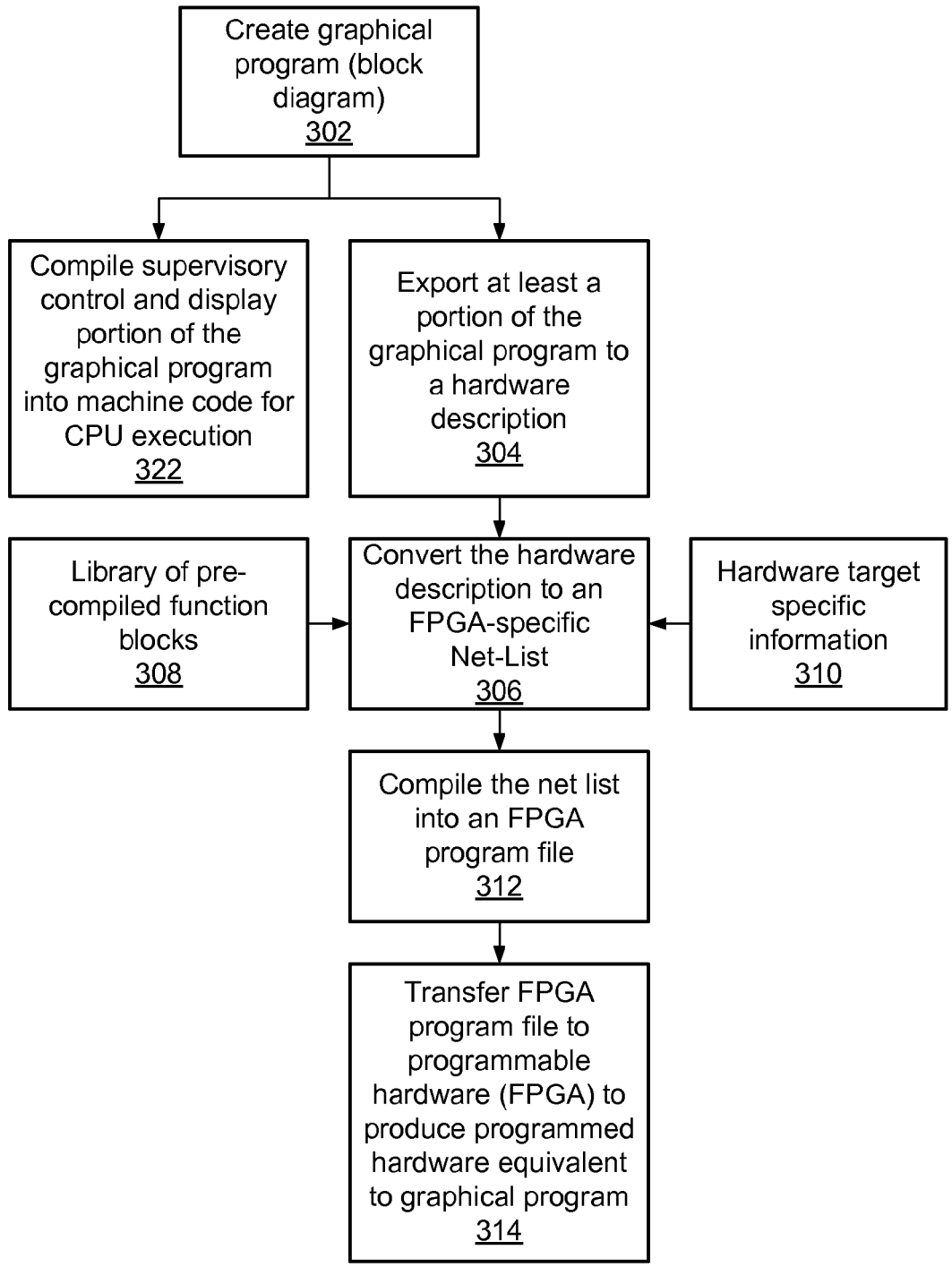
FIG. 4A is a more detailed flowchart diagram illustrating operation of the preferred embodiment of the invention, including compiling a first portion of the graphical program into machine language and converting a second portion of the graphical program into a hardware implementation.

FIG. 4A—Conversion of a Graphical Program into Machine Language and Hardware Implementations FIG. 4A is a more detailed flowchart diagram illustrating operation of the preferred embodiment of the invention, including compiling a first portion of the graphical program into machine language and converting a second portion of the graphical program into a hardware implementation.

As shown in FIG. 4A, after the user has created a graphical program in step 302, the user can optionally select a first portion to be compiled into machine code for CPU execution as is normally done. In the preferred embodiment, the user preferably selects a supervisory control and display portion of the graphical program to be compiled into machine code for a CPU execution. The first portion comprising supervisory control and display portions is compiled for execution on a CPU, such as the host CPU in the computer 102 or the CPU 212 comprised on the interface card 114. This enables the supervisory control and display portions to execute on the host CPU, which is optimal for these elements of the program.

The user selects a second portion for conversion to hardware implementation, which is performed as described above in steps 304-314 of FIG. 4. The portion of the graphical program which is desired for hardware implementation preferably comprises modules or VIs which require a fast or deterministic implementation and/or are desired to execute in a stand-alone hardware unit. In general, portions of the graphical program which are desired to have a faster or more deterministic execution are converted into the hardware implementation. In one embodiment, the entire graphical program is selected for conversion to a hardware implementation, and thus step 322 is not performed.

Figure 5:
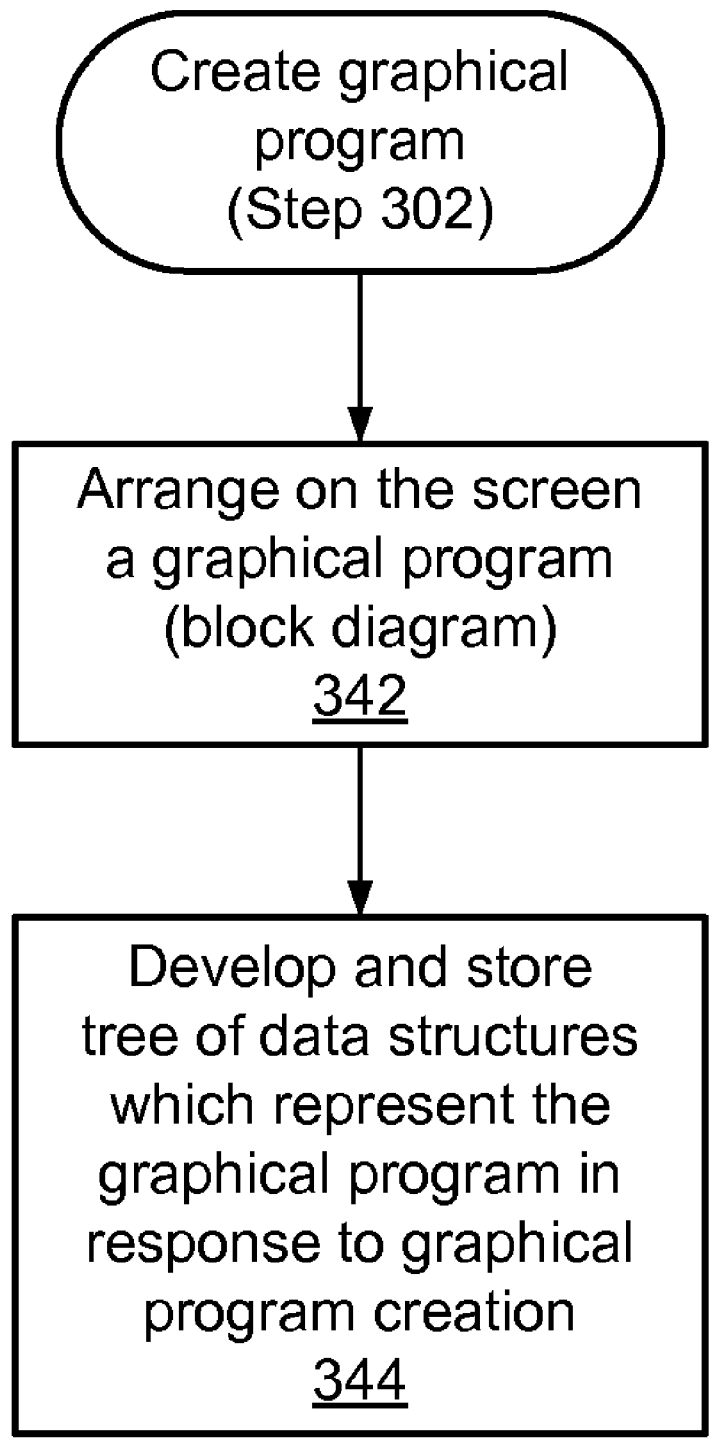
FIG. 5 is a more detailed flowchart diagram illustrating creation of a graphical program according to the preferred embodiment.

FIG. 5—Creation of a Graphical Program

FIG. 5 is a more detailed flowchart diagram of step 302 of FIGS. 4 and 4A, illustrating creation of a graphical program according to the preferred embodiment of the invention. As shown, in step 342 the user arranges on the screen a graphical program or block diagram. This includes the user placing and connecting, e.g., wiring, various icons or nodes on the display screen in order to configure a graphical program. More specifically, the user selects various function icons or other icons and places or drops the icons in a block diagram panel, and then connects or "wires up" the icons to assemble the graphical program. The user also preferably assembles a user interface, referred to as a front panel, comprising controls and indicators which indicate or represent input/output to/from the graphical program. For more information on creating a graphical program in the LabVIEW graphical programming system, please refer to the LabVIEW system available from National Instruments as well as the above patent applications incorporated by reference.

In response to the user arranging on the screen a graphical program, the method operates to develop and store a tree of data structures which represent the graphical program. Thus, as the user places and arranges on the screen function nodes, first nodes, input/output terminals, and connections or wires, etc., the graphical programming system operates to develop and store a tree of data structures which represent the graphical program. More specifically, as the user assembles each individual node and wire, the graphical programming system operates to develop and store a corresponding data structure in the tree of data structures which represents the individual portion of the graphical program that was assembled. Thus, steps 342 and 344 are an iterative process which are repetitively performed as the user creates the graphical program.

Figure 6:
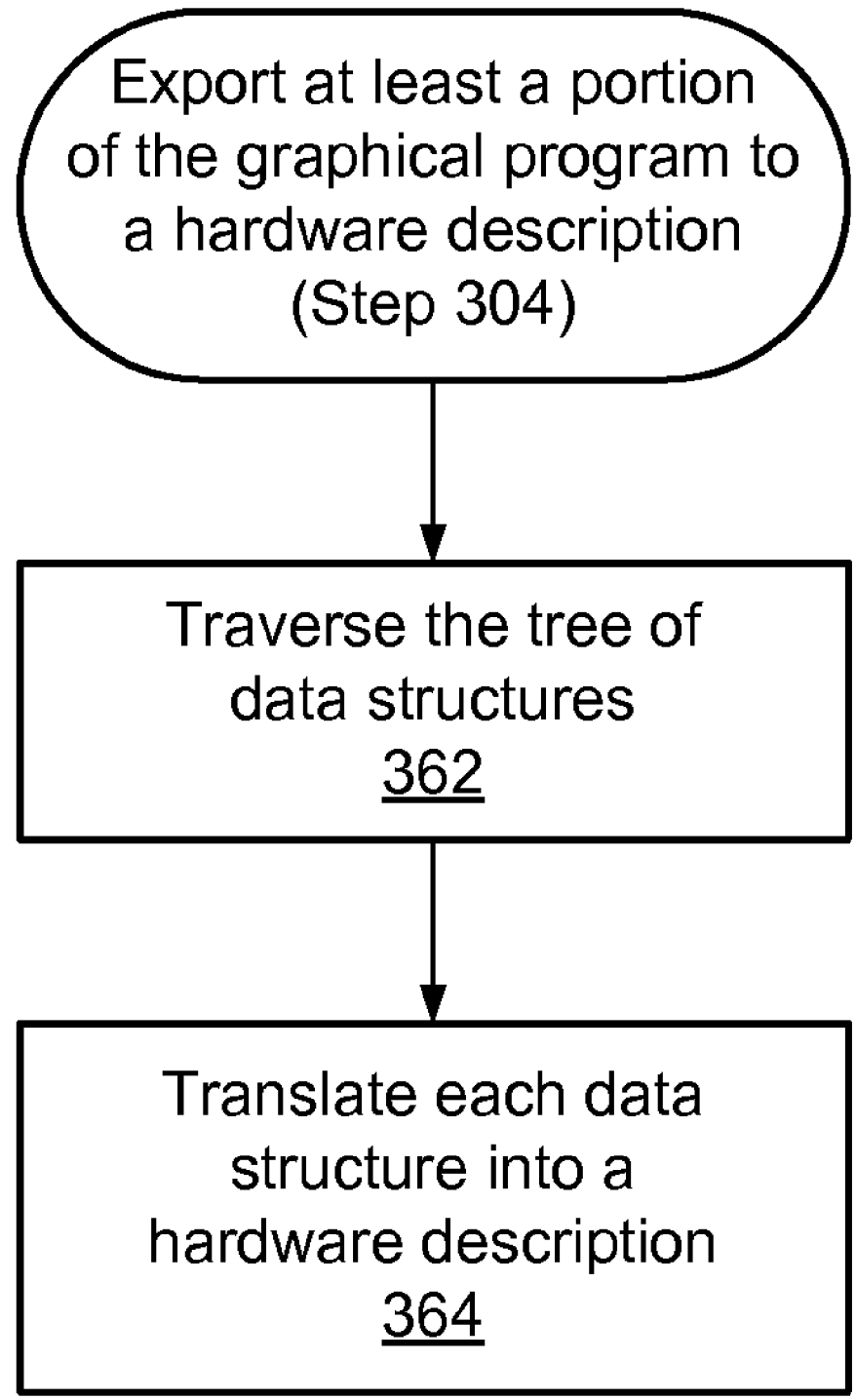
FIG. 6 is a more detailed flowchart diagram illustrating operation of exporting at least a portion of a graphical program to a hardware description.

FIG. 6—Exporting a Portion of the Graphical Program to a Hardware Description FIG. 6 is a flowchart diagram of step 304 of FIGS. 4 and 4A, illustrating operation when the method exports a portion of the graphical program into a hardware description. The tree of data structures created and stored in step 344 preferably comprises a hierarchical tree of data structures based on the hierarchy and connectivity of the graphical program. As shown, in step 362 the method traverses the tree of data structures and in step 364 the method operates to translate each data structure into a hardware description format. In one embodiment, the method first flattens the tree of data structures prior to traversing the tree in step 362.

In the present embodiment, a number of different function icons and/or primitives can be placed in a diagram or graphical program for conversion into a hardware implementation. These primitives include, but are not limited to, function nodes, constants, global variables, control and indicator terminals, first nodes, and sub-VIs, etc. Function icons or primitives can be any data type, but in the current embodiment are limited to Integer or Boolean data types. Also, global variables are preferably comprised on a single global panel for convenience. If a VI appears multiple times, then the VI is preferably re-entrant and may have state information. If a VI is not re-entrant, then preferably multiple copies of the VI are created in hardware if the VI has no state information, otherwise it would be an error.

In the preferred embodiment, each node which is converted to a hardware description includes an Enable input, a Clear_Enable signal input, a master clock signal input and an Enable_Out or Done signal. The Enable input guarantees that the node executes at the proper time, i.e., when all of its inputs have been received. The Clear_Enable signal input is used to reset the node if state information remembers that the node was done. The Enable_Out or Done signal is generated when the node completes and is used to enable operation of subsequent nodes which receive an output from the node. Each node which is converted to a hardware description also includes the data paths depicted in the graphical program.

For While loop structures, Iteration structures, Sequence structures, and Case Structures, the respective structure is essentially abstracted to a control circuit or control block. The control block includes a diagram enable out for each sub-diagram and a diagram done input for each sub-diagram.

In addition to the above signals, e.g., the Enable input, the Clear_Enable signal input, the master clock signal input, and the Enable_Out or Done signal, all global variables have numerous additional signals, including CPU interface signals which are specific to the type of CPU and bus, but typically include data lines, address lines, clock, reset and device select signals. All VIs and sub-VIs also include CPU interface signals if they contain a global variable.

In the preferred embodiment, when an icon is defined for a VI used solely to represent a hardware resource connected to the FPGA, e.g., an A/D converter, with a number of inputs and outputs, a string control is preferably placed on the front panel labeled VHDL. In this case, the default text of the string control is placed in the text file created for the VHDL of the VI. Thus, in one embodiment, a library of VIs are provided each representing a physical component or resource available in or to the FPGA. As these VHDL files representing these VIs are used, the method of the present invention monitors their usage to ensure that each hardware resource is used only once in the hierarchy of VIs being exported to the FPGA. When the VHDL file is written, the contents of the string control are used to define the access method of that hardware resource.

The following is pseudo-code which describes the operations performed in the flowchart of FIG. 6:

GenCircuit (vi)
    send GenCircuit to top level diagram of vi

Diagram:GenCircuit(d)
    send GenCircuit to each constant in d
    send GenCircuit to each node in d
    send GenCircuit to each signal in d Signal: GenCircuit(s)
    declare type of signal s BasicNode:GenCircuit(n)
    declare type of component needed for n
    declare AND-gate for enabling n (if needed)
    list connections for all node inputs
    list connections for all inputs to enabling AND-gate (if needed)

Constant:GenCircuit(c)
    declare type and value of constant c

WhileLoopNode:GenCircuit(n)
    declare while loop controller component
    declare AND-gate for enabling n (if needed)
    list connections for all node inputs
    list connections for all inputs to enabling AND-gate (if needed)
    declare type of each shift register component
    list connections for all inputs to all shift registers
    declare type of each tunnel component
    list connections for all inputs to all tunnels CaseSelectNode:GenCircuit (n)
    declare case select controller component
    declare AND-gate for enabling n (if needed)
    list connections for all node inputs
    list connections for all inputs to enabling AND-gate (if needed)
    declare type of each tunnel component
    list connections for all inputs to all tunnels SequenceNode:GenCircuit (n)
    declare sequence controller component
    declare AND-gate for enabling n (if needed)
    list connections for all node inputs
    list connections for all inputs to enabling AND-gate (if needed)
    declare type of each tunnel component
    list connections for all inputs to all tunnels SubVINode:GenCircuit (n)
    send GenCircuit to the subVI of n
    associate inputs & outputs of subVI with those of n
    declare AND-gate for enabling n (if needed)
    list connections for all node inputs
    list connections for all inputs to enabling AND-gate (if needed)

Referring to the above pseudo code listing, the method starts at the VI level (the top level) and begins generation of VHDL by sending a message to the top level diagram. The method in turn effectively provides a message from the diagram to each constant, each node, and each signal in the diagram.

For signals, the method then declares the signal type.

For basic nodes, the method declares a type of the component needed, and also declare an AND-gate with the proper number of inputs needed in order to enable itself. In other words, basic nodes declare an AND-gate with a number of inputs corresponding to the number of inputs received by the node. Here, optimization is preferably performed to minimize the number of inputs actually needed. For example, if a node has three inputs, the node does not necessarily need a three input AND-gate if two of those inputs are coming from a single node. As another example, if one input comes from node A and another input comes from node B, but node A also feeds node B, then the input from node A is not needed in the AND gate. Thus various types of optimization are performed to reduce the number of inputs to each AND gate. For the basic node, the method also lists the connections for all of its inputs as well as the connections for all inputs to the enabling AND-gate.

For a constant, the method simply declares the type and the value of the constant.

For a While loop, the method declares a While loop controller component. The method also declares an AND-gate, lists AND-gate inputs, and lists node inputs in a similar manner to the basic node described above. The method then declares the type for each shift register and includes a component for the shift register, and lists all the connections for the shift register inputs. If any tunnels are present on the While loop, the method declares the type of each tunnel component and list the connections for the inputs to the tunnels. For most tunnels, the method simply equivalences the signals for the inside and outside, without any effect.

The method proceeds in a similar manner for Case and Sequence structures. For Case and Sequence structures, the method declares a case select controller component or a sequence controller component, respectively. For both Case and Sequence structures, the method also declares an AND-gate, lists AND-gate inputs, and lists node inputs in a similar manner to the basic node described above. The method then declares the component needed for any tunnels and list the connections for the inputs to the tunnels.

For a sub-VI, the method sends a message to the sub-VI and associates inputs and outputs of the sub-VI with those of n.

The method then declares an AND-gate, lists AND-gate inputs, and lists node inputs in a similar manner to the basic node described above.

Figure 7:
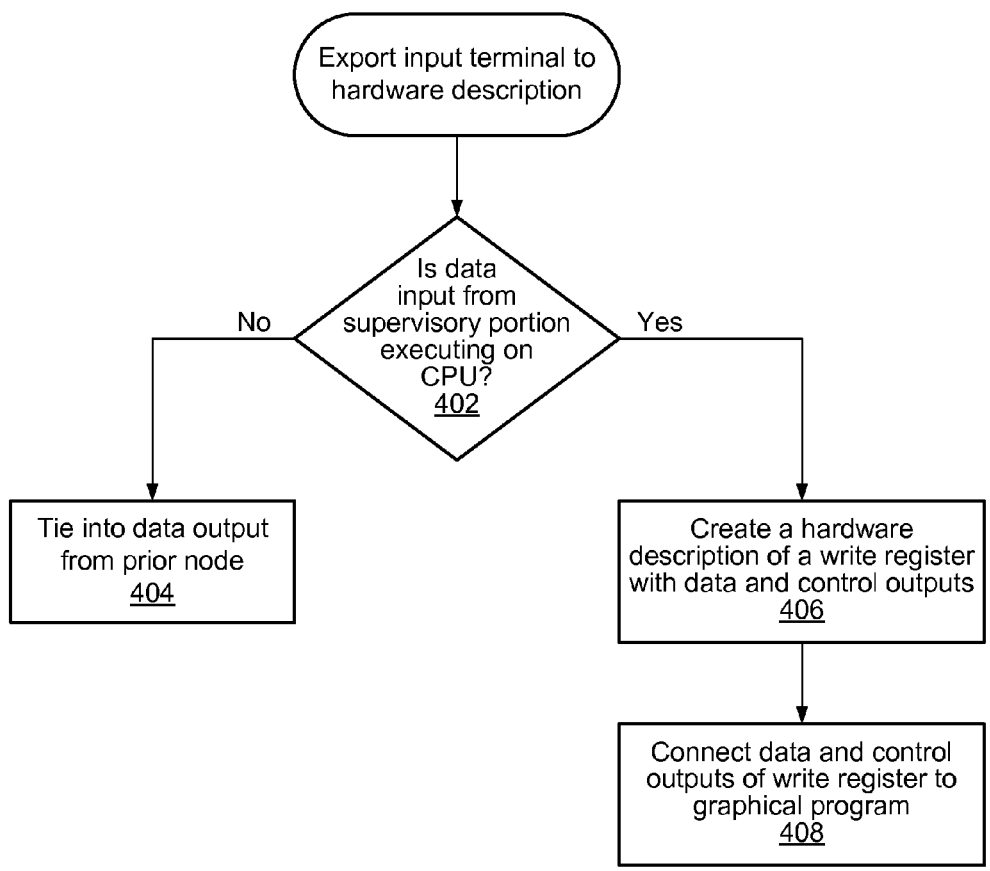
FIG. 7 is a flowchart diagram illustrating operation where the method exports an input terminal into a hardware description.

FIG. 7—Exporting an Input Terminal into a Hardware Description

FIG. 7 is a flowchart diagram illustrating operation when the method exports an input terminal into the hardware description format. As shown, in step 402 the method determines if the data provided to the input terminal is input from a portion of the graphical program which will be executing on the CPU, i.e., the portion of the graphical program which is to be compiled into machine language for execution on the CPU, or whether the data is input from another portion of the graphical program that is also being transformed into a hardware implementation.

As shown, if the data input to the input terminal is determined in step 402 to be input from a portion of the graphical program being compiled for execution on the CPU, in step 406 the method creates a hardware description of a write register with a data input and data and control outputs. The write register is operable to receive data transferred by the host computer, i.e., generated by the compiled portion executing on the CPU. In step 408 the data output of the write register is connected for providing data output to other elements in the graphical program portion. In step 408 the control output of the write register is connected to other elements in the graphical program portion for controlling sequencing of execution, in order to enable the hardware description to have the same or similar execution order as the graphical program.

If the data is determined to not be input from a portion being compiled for execution on the CPU step in 402, i.e., the data is from another node in the portion being converted into a hardware implementation, then in step 404 the method ties the data output from the prior node into this portion of the hardware description, e.g., ties the data output from the prior node into the input of dependent sub-modules as well as control path logic to maintain the semantics of the original graphical program.

Figure 8:
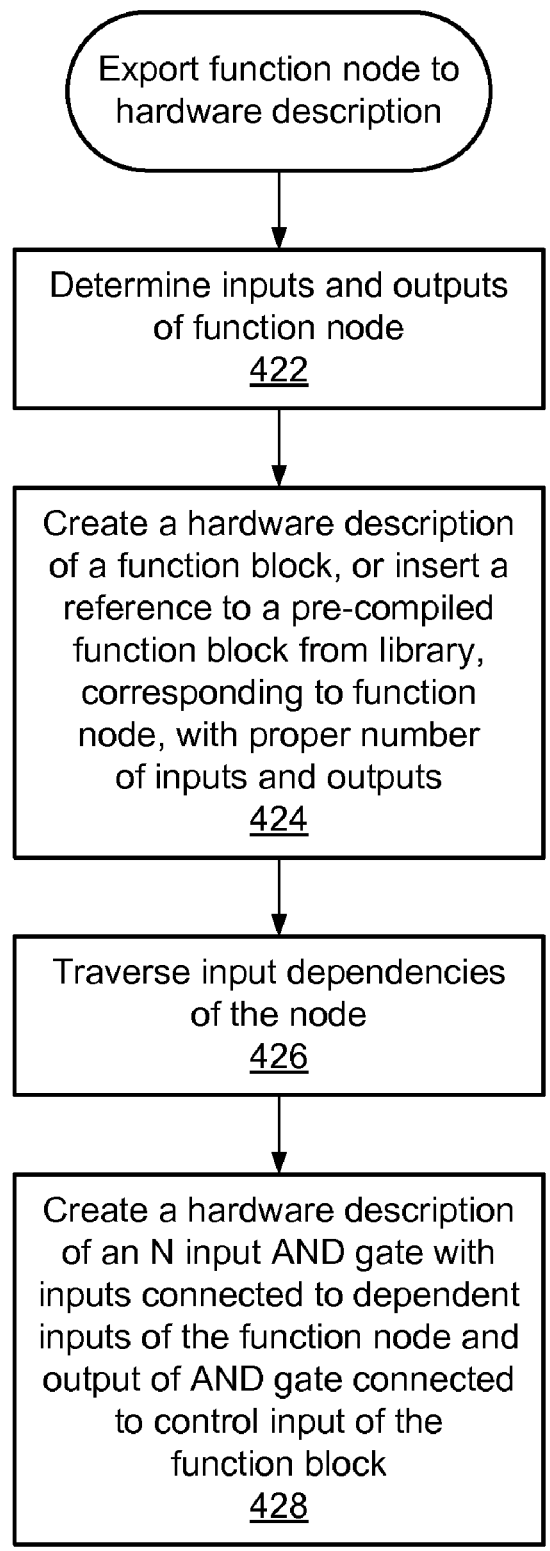
FIG. 8 is a flowchart diagram illustrating operation where the method exports a function node into a hardware description.

FIG. 8—Exporting a Function Node into a Hardware Description

FIG. 8 is a flowchart diagram illustrating operation where the method exports a function node into the hardware description format. In the preferred embodiment, the term "function node" refers to any various types of icons or items which represent a function being performed. Thus, a function node icon represents a function being performed in the graphical program. Examples of function nodes include arithmetic function nodes, e.g., add, subtract, multiply, and divide nodes, trigonometric and logarithmic function nodes, comparison function nodes, conversion function nodes, string function nodes, array and cluster function nodes, file I/O function nodes, etc.

As shown in FIG. 8, in step 422 the method determines the inputs and outputs of the function node. In step 424 the method creates a hardware description of the function block corresponding to the function node with the proper number of inputs and outputs as determined in step 422. Alternatively, in step 424 the method includes a reference in the hardware description to a pre-compiled function block from the library 308. In this case, the method also includes the determined number of inputs and outputs of the function node.

In step 426 the method traverses the input dependencies of the node to determine which other nodes provide outputs that are provided as inputs to the function node being converted. In step 428 the method creates a hardware description of an N input AND gate, wherein N is the number of inputs to the node, with each of the N inputs connected to control outputs of nodes which provide inputs to the function node. The output of the AND gate is connected to a control input of the function block corresponding to the function node.

In the data flow diagramming model of the preferred embodiment, a function node can only execute when all of its inputs have been received. The AND gate created in step 428 emulates this function by receiving all control outputs of nodes which provide inputs to the function node. Thus the AND gate operates to effectively receive all of the dependent inputs that are connected to the function node and AND them together to provide an output control signal which is determinative of whether the function node has received all of its inputs. The output of the AND gate is connected to the control input of the function block and operates to control execution of the function block. Thus, the function block does not execute until the AND gate output provided to the control input of the function block provides a logic signal indicating that all dependent inputs which are input to the function node have been received.

Figure 9:
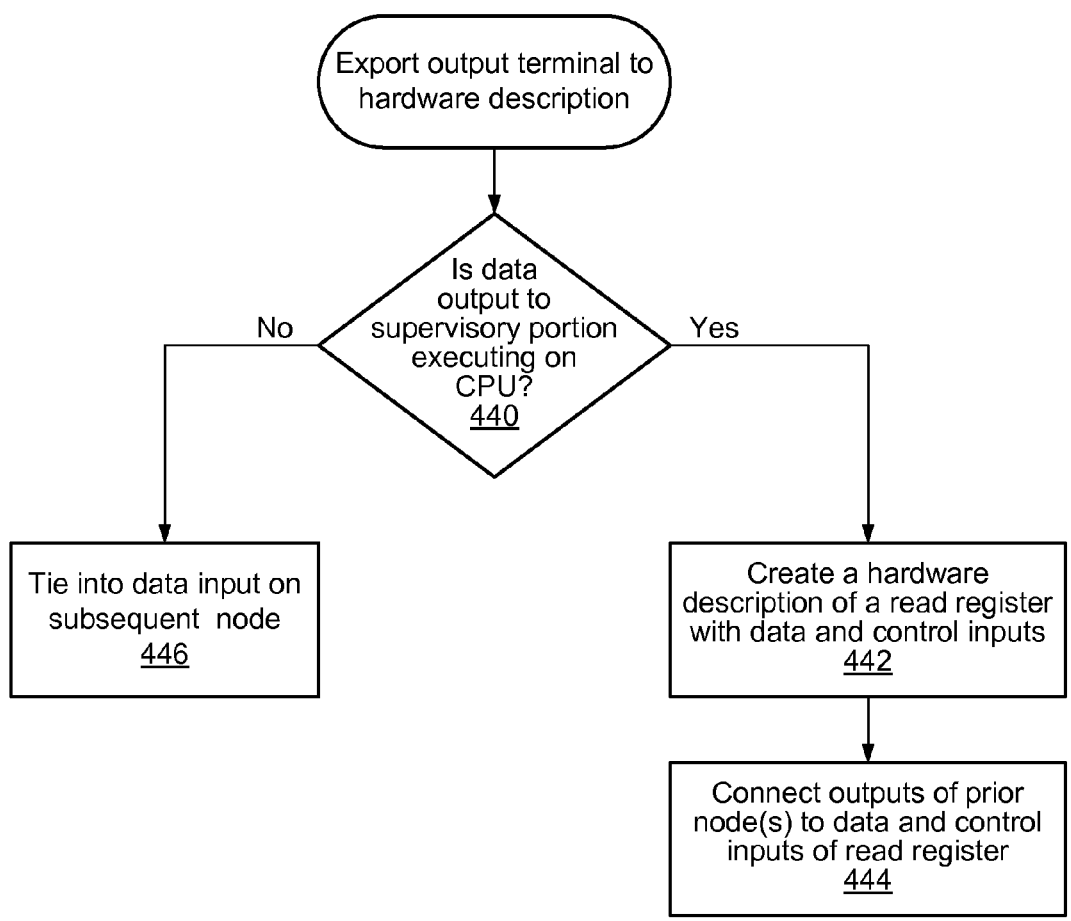
FIG. 9 is a flowchart diagram illustrating operation where the method exports an output terminal into a hardware description.

FIG. 9—Exporting an Output Terminal into a Hardware Description

FIG. 9 is a flowchart diagram illustrating operation where the method exports an output terminal into the hardware description. As shown, in step 440 the method determines if the data provided from the output terminal is output to a portion of the graphical program which will be executing on the CPU, i.e., the portion of the graphical program which is to be compiled into machine language for execution on the CPU, or whether the data is output to another portion of the graphical program that is also being transformed into a hardware implementation.

As shown, if the data output from the output terminal is determined in step 440 to be output to a portion of the graphical program being compiled for execution on the CPU, then in step 442 the method creates a hardware description of a read register with a data input and data and control outputs. The read register is operable to receive data generated by logic representing a prior node in the graphical program.

In step 444 the method connects the data output of a prior node to the data input of the read register. In step 444 the control input of the read register is also connected to control sequencing of execution, i.e., to guarantee that the read register receives data at the proper time. This enables the hardware description to have the same or similar execution order as the graphical program.

If the data is determined to not be output to a portion being compiled for execution on the CPU step in 440, i.e., the data is to another node in the portion being converted into a hardware implementation, then in step 446 the method ties the data output from the output terminal into a subsequent node in this portion of the hardware description, e.g., ties the data output from the output terminal into the input of subsequent sub-modules as well as control path logic to maintain the semantics of the original graphical program.

Figure 10:
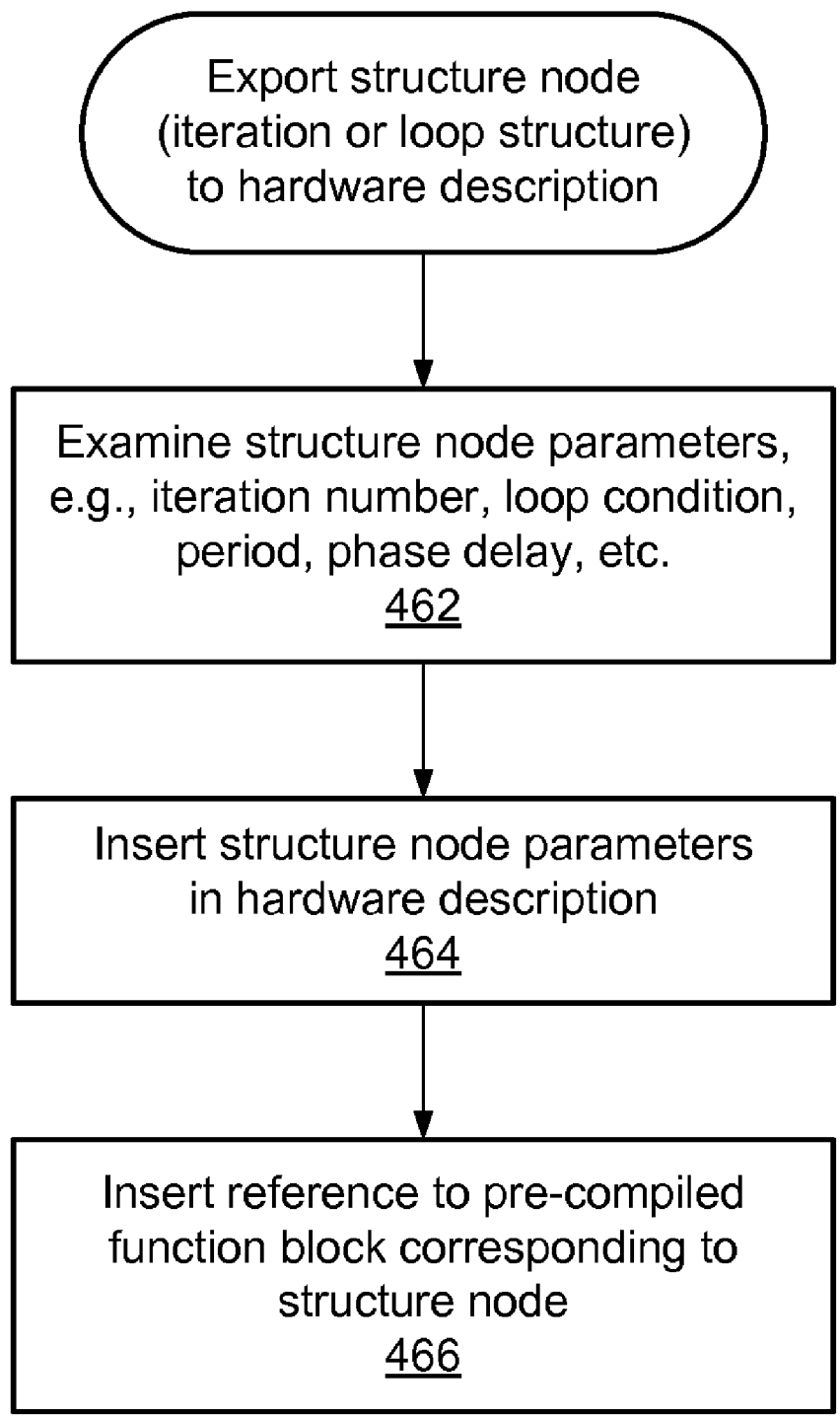
FIG. 10 is a flowchart diagram illustrating operation where the method exports a first node into a hardware description.

FIG. 10—Exporting a First Node into a Hardware Description

FIG. 10 is a flowchart diagram illustrating operation where the method exports a first node into the hardware description. In the preferred embodiment, the term "first node" refers to a node which represents control flow of data, including iteration, looping, sequencing, and conditional branching. Examples of first nodes include For/Next loops, While/Do loops, Case or Conditional structures, and Sequence structures. For more information on first nodes, please see the above LabVIEW patents referenced above.

The flowchart of FIG. 10 illustrates exporting a loop first node into a hardware description. As shown, in step 462 the method examines the first node parameters, e.g., the iteration number, loop condition, period, phase delay, etc. As discussed above, the graphical programming system preferably allows the user to insert certain parameters into a first node to facilitate exporting the first node into a hardware description. Iteration and looping first nodes have previously included an iteration number and loop condition, respectively. According to the preferred embodiment of the invention, these first nodes further include period and phase delay parameters, which are inserted into or assigned to the first node. These provide information on the period of execution and the phase delay of the first node. As discussed below, the period and phase delay parameters, as well as the iteration number or loop condition, are used to facilitate exporting the first node into a hardware description.

In step 464, the method inserts the first node parameters into the hardware description. In step 466 the method inserts a reference to a pre-compiled function block corresponding to the type of first node. In the case of a looping first node, the method inserts a reference to a pre-compiled function block which implements the looping function indicated by the first node. The method also connects controls to the diagram enclosed by the first node.

Figure 11:
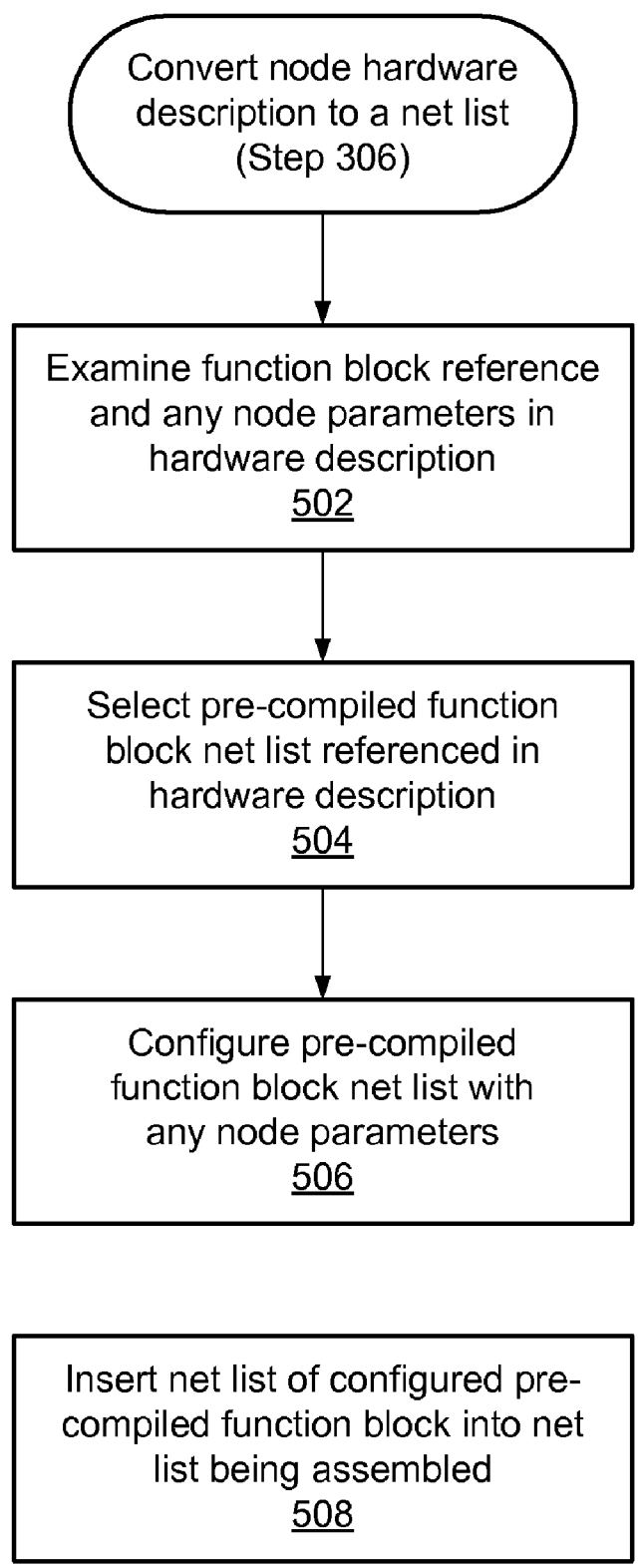
FIG. 11 illustrates converting a node hardware description to a net list.

FIG. 11—Converting a Node into a Hardware Description

FIG. 11 is a flowchart diagram of a portion of step 306 of FIGS. 4 and 4A, illustrating operation where the method converts the hardware description for a node into a net list. FIG. 11 illustrates operation of converting a hardware description of a node, wherein the hardware description comprises a reference to a function block and may include node parameters. It is noted that where the hardware description of a node comprises a description of the actual registers, gates, etc. which perform the operation of the node, then conversion of this hardware description to a net list is readily performed using any of various types of synthesis tools.

As shown, in step 502 the method examines the function block reference and any node parameters present in the hardware description. In step 504, the method selects the referenced pre-compiled function block from the library 308, which essentially comprises a net list describing the function block. In step 506 the method then configures the pre-compiled function block net list with any parameters determined in step 502. In step 508 the method then inserts the configured pre-compiled function block into the net list which is being assembled.

Figure 12:
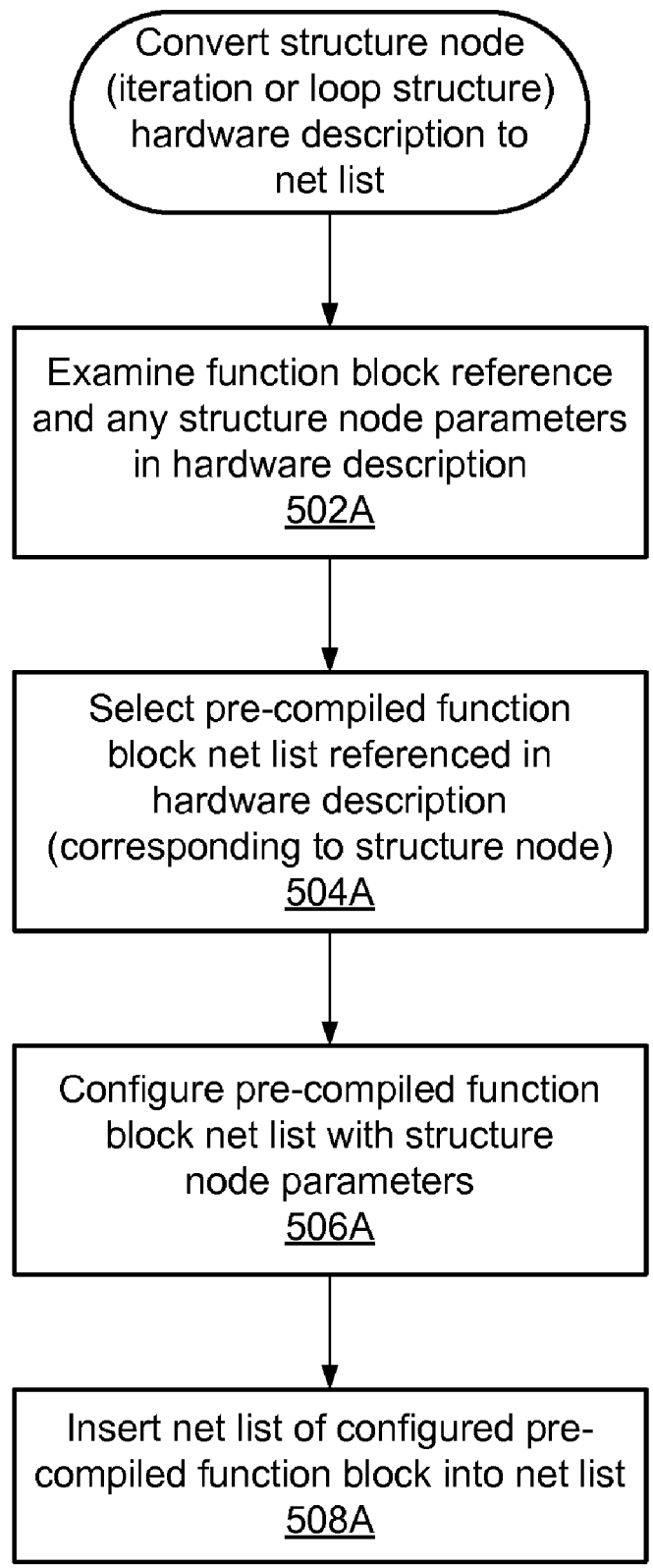
FIG. 12 illustrates converting a first node hardware description to a net list.

FIG. 12—Converting a First Node into a Hardware Description

FIG. 12 is a flowchart diagram illustrating operation of the flowchart of FIG. 11, where the method converts the hardware description for a first node into a net list. FIG. 12 illustrates operation of converting a hardware description of a first node, wherein the hardware description comprises a reference to a first node function block and includes first node parameters.

As shown, in step 502A the method examines the function block reference and the first node parameters present in the hardware description. The first node parameters may include parameters such as the iteration number, loop condition, period, phase delay, etc. In step 504A the method selects the referenced pre-compiled function block from the library 308, which essentially is a net list describing the first node function block. In step 506A the method then configures the pre-compiled function block net list with the first node parameters determined in step 502A. This involves setting the period and phase delay of execution of the first node as well as any other parameters such as iteration number, loop condition, etc. In step 508A the method then inserts the configured pre-compiled function block into the net list which is being assembled.

Figure 13:
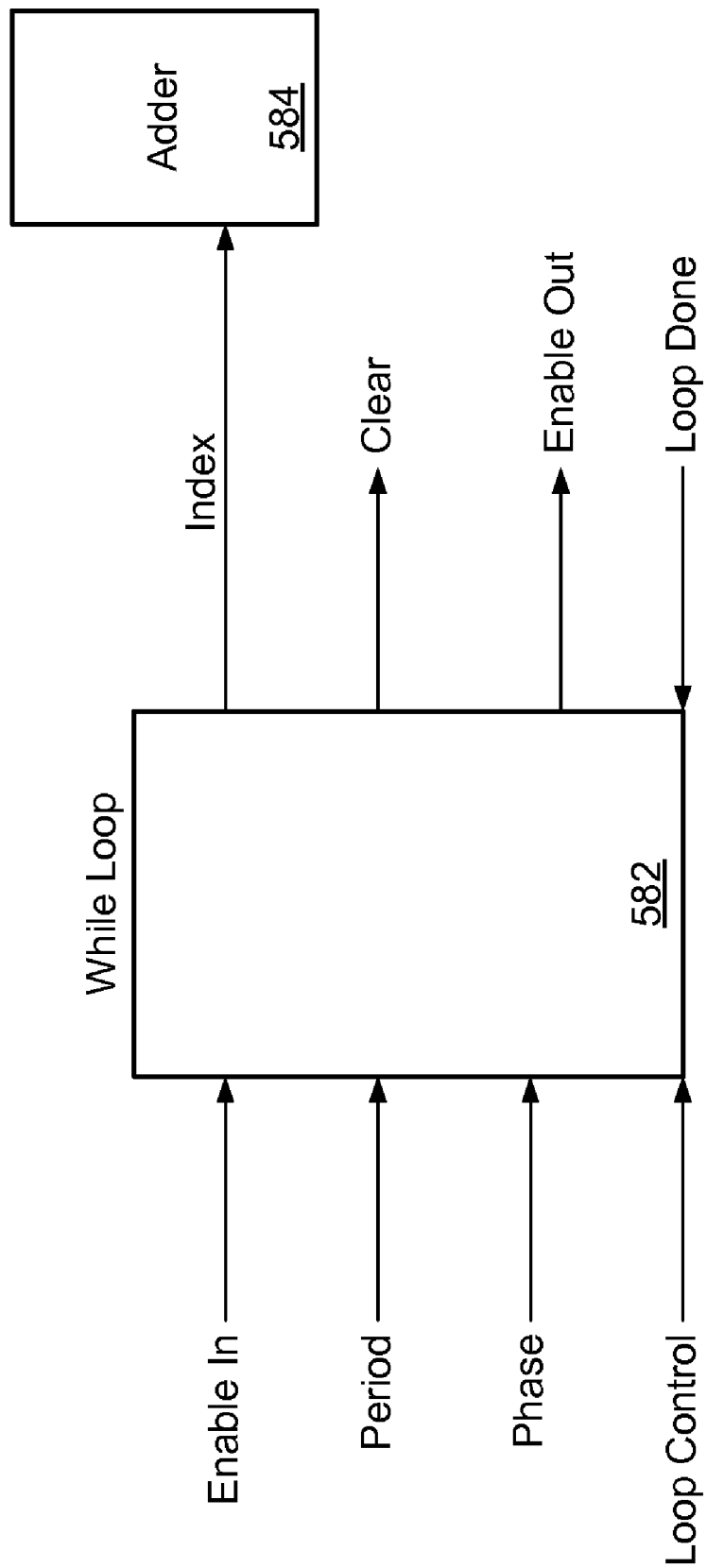
FIG. 13 illustrates the function block for a first node.

FIG. 13—Function Block for a First Node

FIG. 13 is a block diagram illustrating a While loop function block. As shown, the While loop function block includes enabling period and phase inputs as well as a loop control input. The While loop function block provides an index output which is provided to and adder. The adder operates to increment each time the index signals provided to monitor the number of times the While loop is executed. The While loop further outputs Clear and Enable Out signals to control the program within the While loop and further receives a Loop Done signal input which is used to indicate whether the loop has completed.

Figure 14:
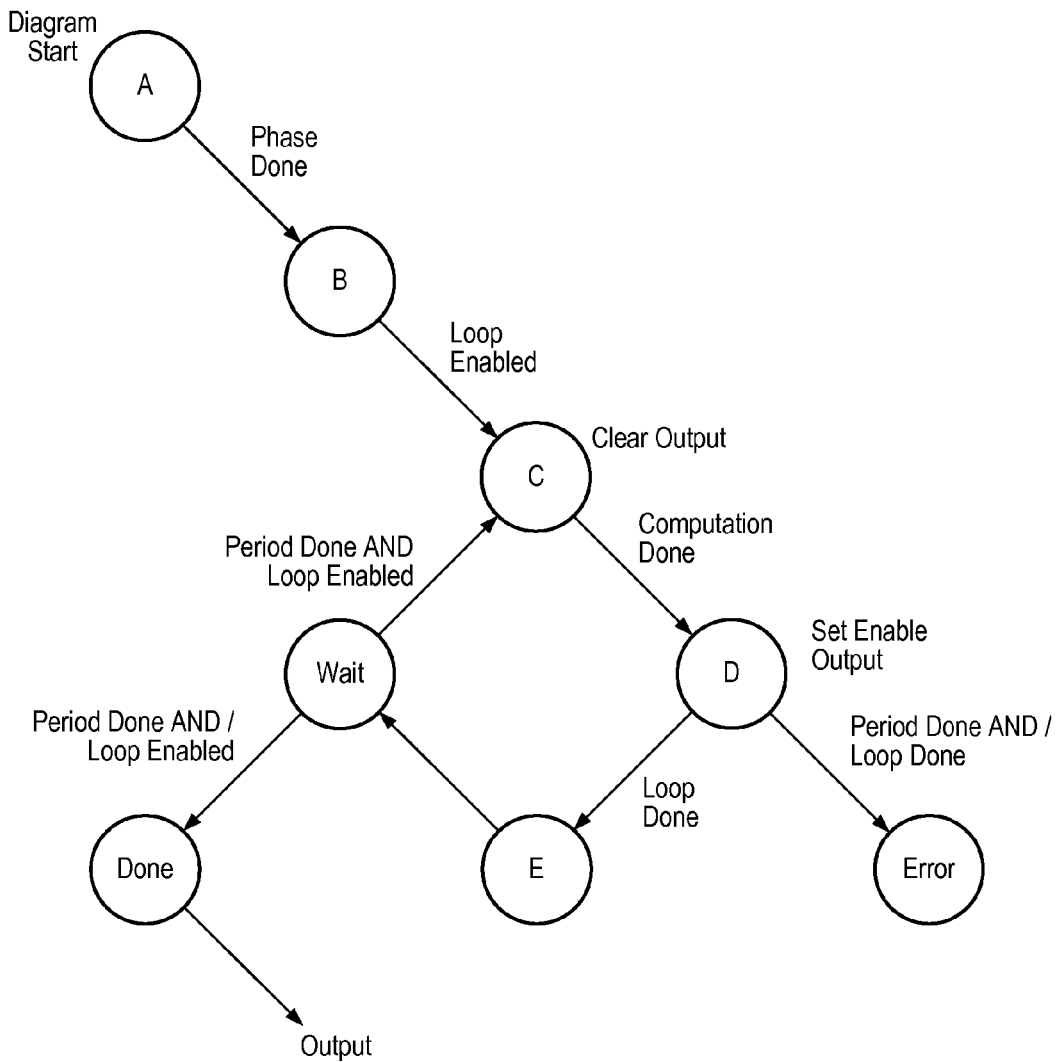
FIG. 14 is a state diagram illustrating operation of the first node function block of FIG. 13.

FIG. 14—Operation of First Node Function Block

FIG. 14 is a state diagram illustrating operation of the while loop function block shown in FIG. 13. As shown, a diagram start operation precedes to state A. When Phase Done is true indicating that the phase has completed, then the state machine advances to state B. The state machine remains in state B until the Loop Enable signal is true, indicating that the loop has been enabled to begin execution. When the Loop Enable signal is asserted, the state machine advances from state B to state C. In state C the Clear Output signal is asserted, clearing the loop output prior to execution of the loop.

The state machine then advances from state C to state D. In state D the computation is performed, and the Set Enable out signal is asserted. If the period is done and the loop is not yet completed, signified by the equation:

Period Done and /Loop Done then the state machine proceeds to an error state and operation completes. Thus, the period set for execution for the loop was not sufficiently long to allow the loop to complete. In other words, the loop took more time to complete than the period set for execution of the loop.

The state machine advances from state D to state E when the Loop Done signal is asserted prior to the Period Done signal being asserted, indicating that the loop has completed prior to the period allotted for the loop execution being over.

The state machine then advances from state E to a wait state, as shown. If the period is done and the loop is not re-enabled, signified by the condition:

Period Done & /Loop Enabled then the state machine advances from the Wait to the Done state. If the period has completed and the loop is still enabled, indicating that another execution of the loop is necessary, then the state machine advances from the Wait state back to the C state. Thus, the state machine advances through state C, D, E, and Wait to perform looping operations.

Figure 15:
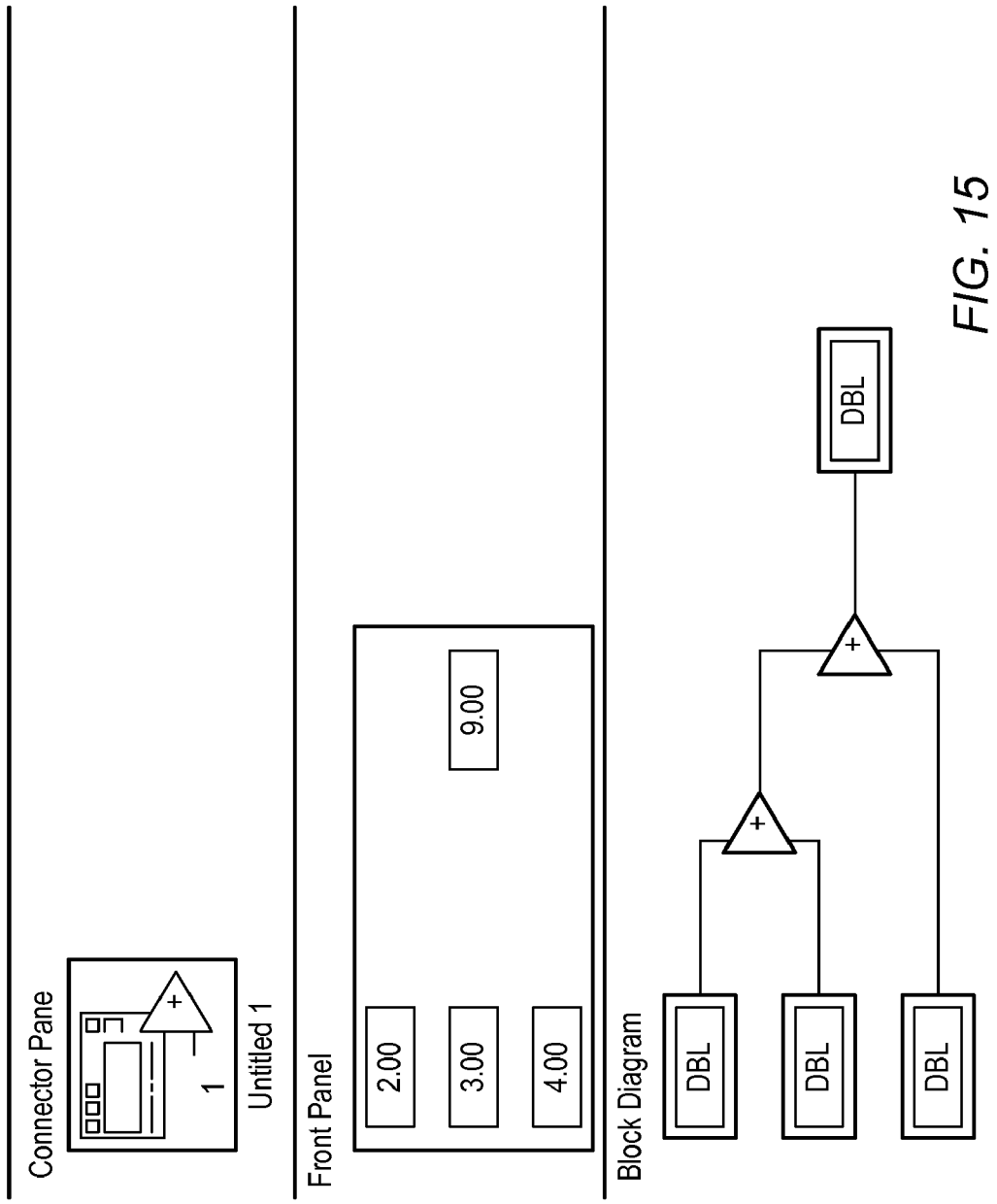

FIG. 15—Simple Graphical Program Example

FIG. 15 illustrates a simple example of a graphical program. In FIG. 15 the graphical program includes three input terminals and one output terminal. The graphical program simply comprises a first 2-input Add function node which receives input from two inputs terminals, and a second 2-input Add function node which receives the output from the first Add function node and receives an output from the third input terminal. The second 2-input Add function node provides an output to output terminal as shown.

Figure 16:
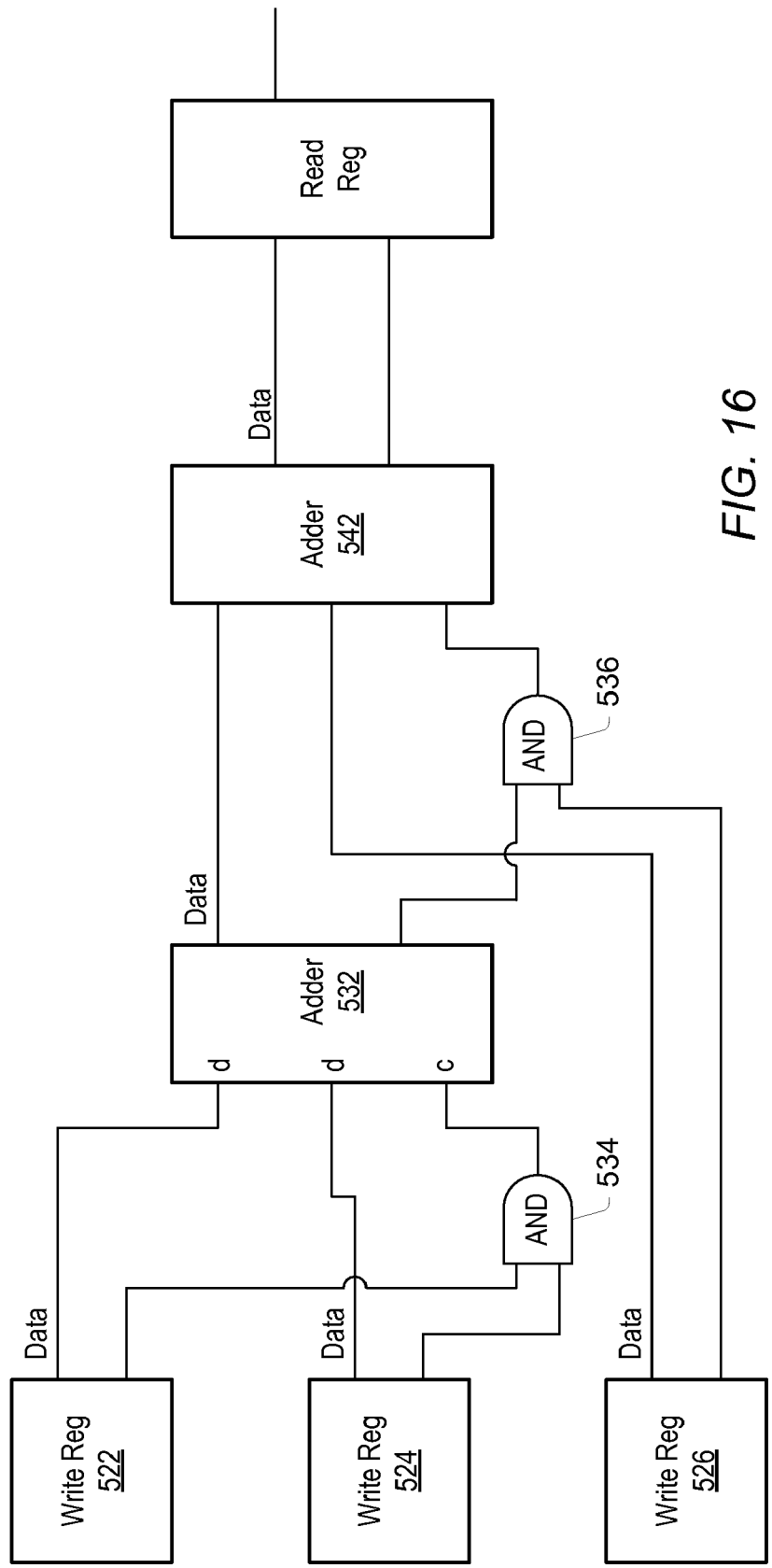

FIG. 16—Hardware Result

FIG. 16 is a conceptual diagram of the resulting hardware after the graphical program example of FIG. 15 is converted into a hardware description. As shown, the hardware diagram includes three write registers 522-526 corresponding to each of the three input terminals. The data outputs of the first two write registers 522 and 524 are provided as inputs to a first two-input adder 532, which corresponds to the first adder in the block diagram of FIG. 15. The hardware description also involves creating an AND gate 534 which receives control outputs from each of the first two write registers 522 and 524 and provides a single output to the control input of the adder 532. The purpose of the AND gate 534 is to prevent the adder 532 from executing until both inputs have been received.

The Adder 532 provides a data output to a second two-input Adder 542, which corresponds to the second adder in the block diagram of FIG. 15. The first Adder 532 also generates an enable out signal which is provided to an input of a second AND gate 536. The other input of the AND gate 536 receives an output from the third write register 526, corresponding to the third input terminal. The AND gate 536 provides an output to a control input of the second adder 542. Thus, the AND gate 536 operates to ensure that the second adder 542 does not execute until all inputs have been received by the adder 542. The second adder 542 provides a data output to a read register 546 associated with the output terminal. The second adder 542 also provides an enable out signal to the read register 546, which notifies the read register 546 when valid data has been provided.

Thus, as shown, to create a hardware description for each of the input terminals, the flowchart diagram of FIG. 6 is executed, which operates to create a hardware description of a write register 522, 524, and 526, each with data and control outputs. For each adder function node, the flowchart diagram of FIG. 7 is executed, which operates to create a hardware description of an adder 532 or 542, and further creates an associated N input AND gate 534 or 536, with inputs connected to the dependent inputs of the adder function node to ensure execution at the proper time. Finally, the flowchart diagram of FIG. 8 is executed for the output terminal of the graphical program, which operates to generate a hardware description of a read register with data and control inputs.

Figure 17:
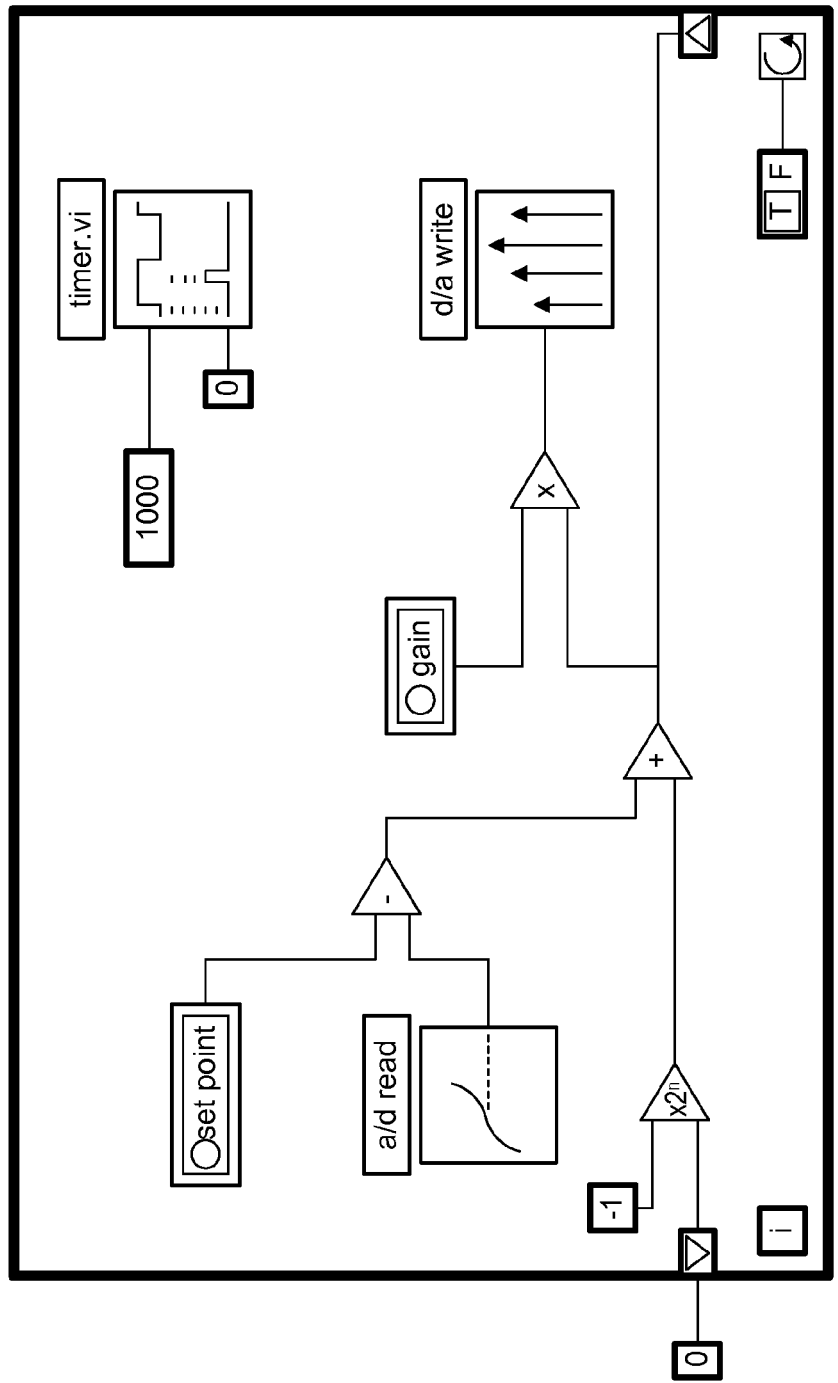
Figure 18:
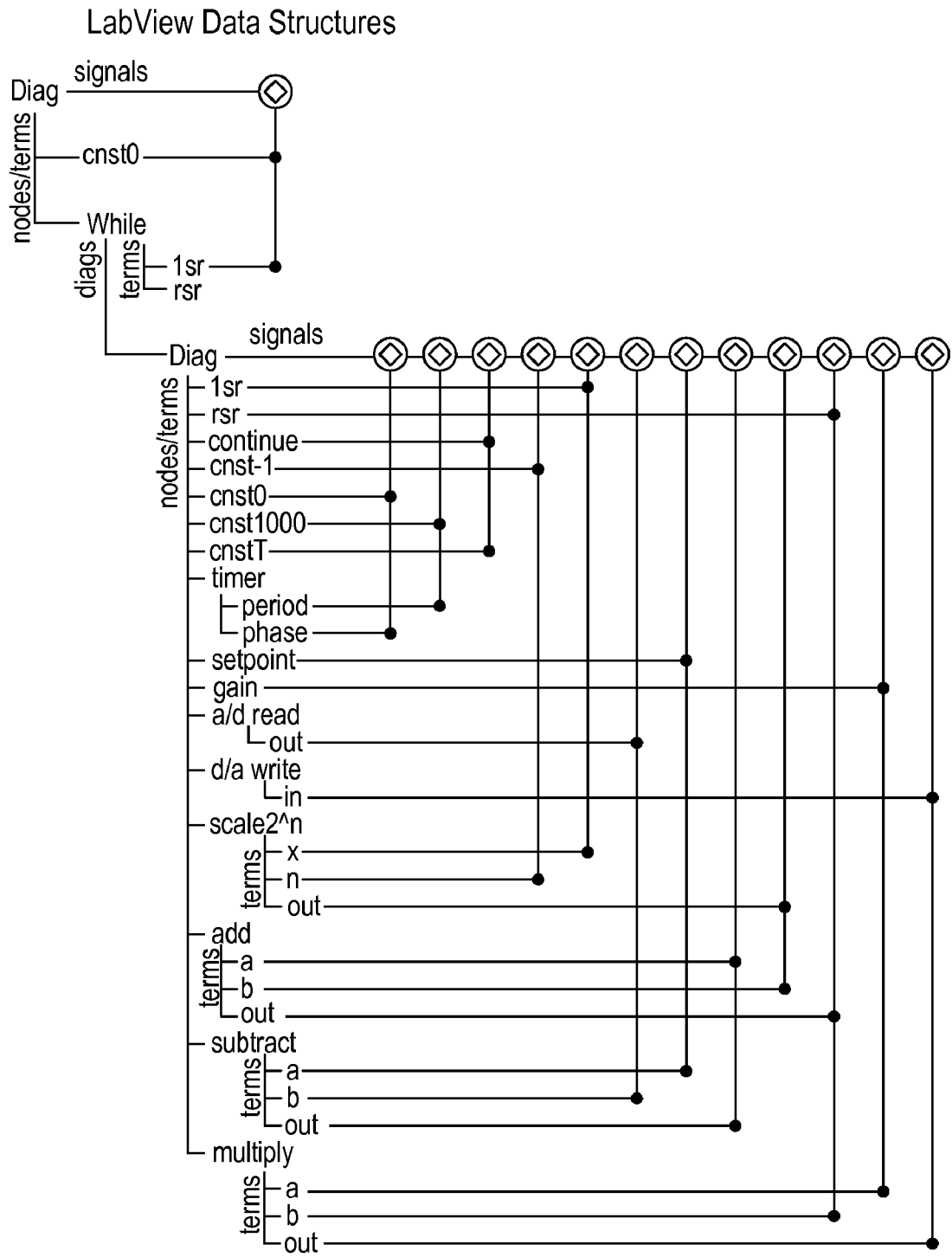
Figure 19:
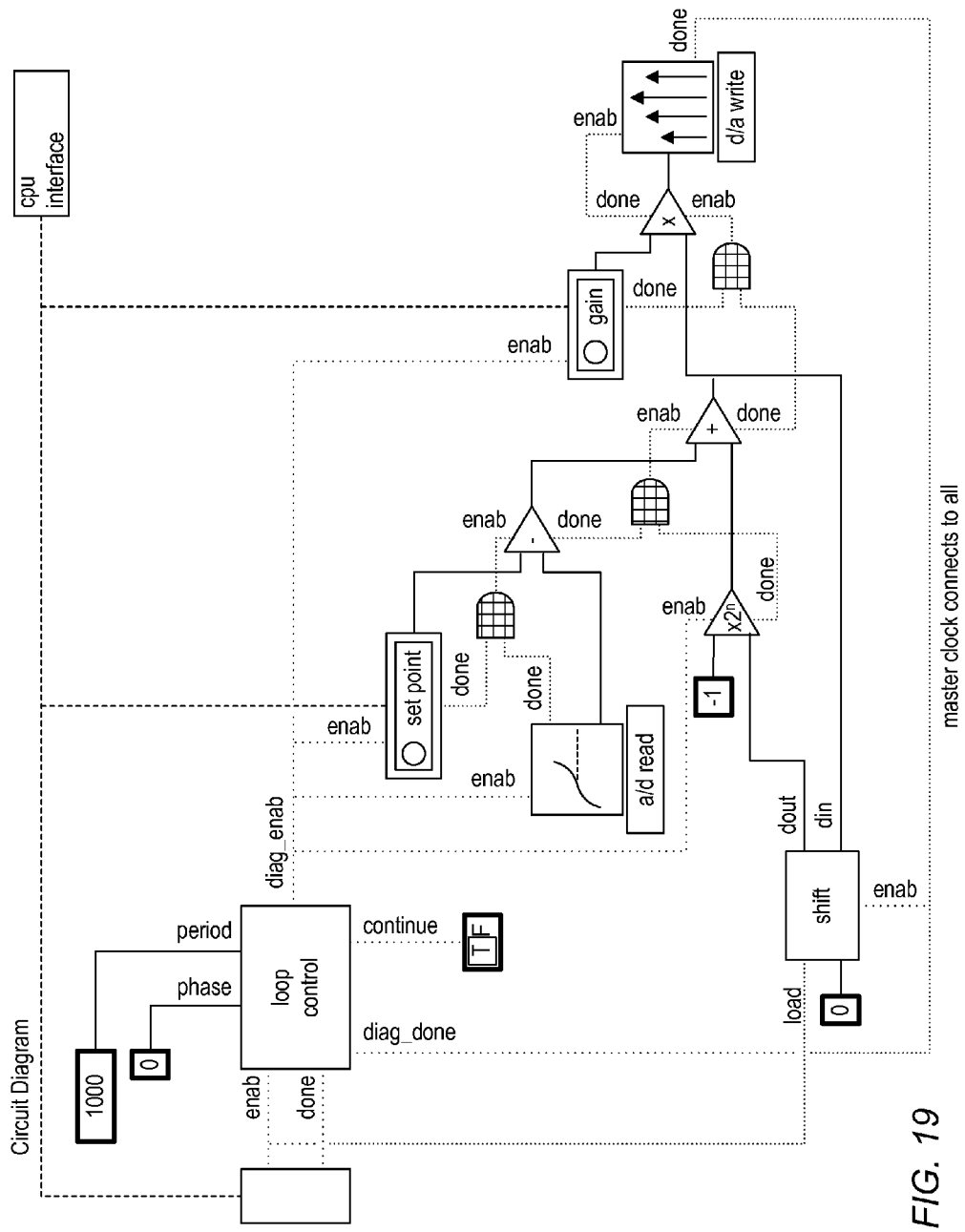
Figure 20:
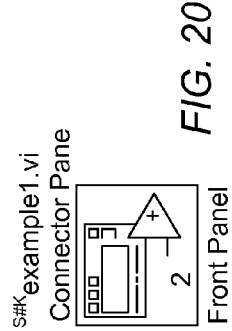
FIGS. 20-22 are source code listings of a graphical program.
Figure 21:
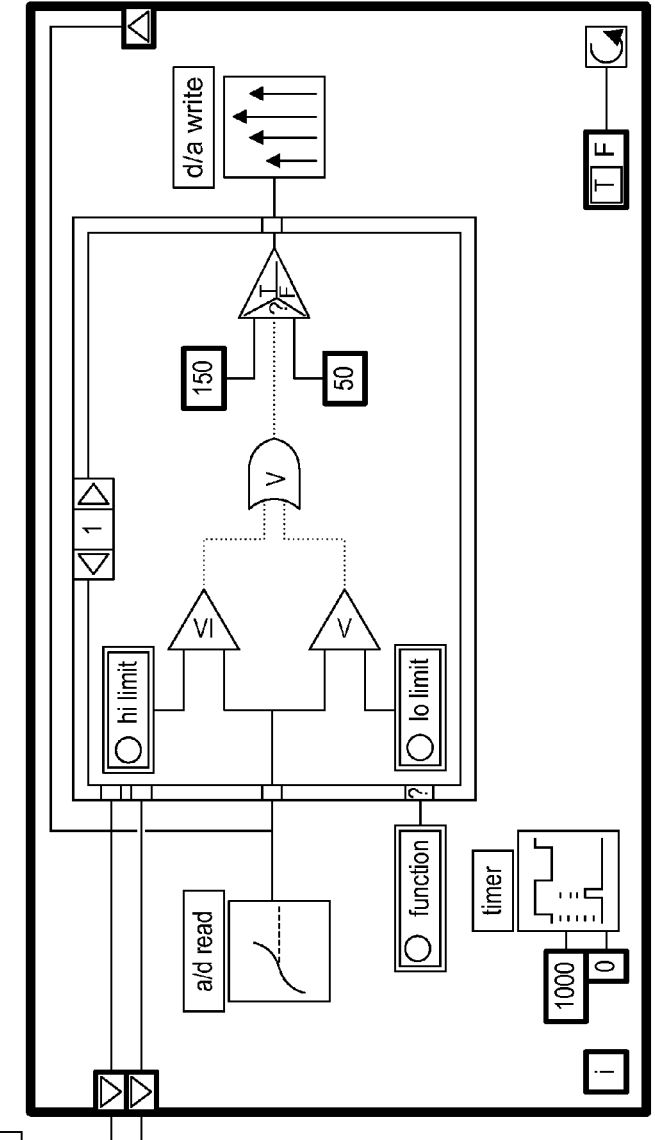
Figure 22:
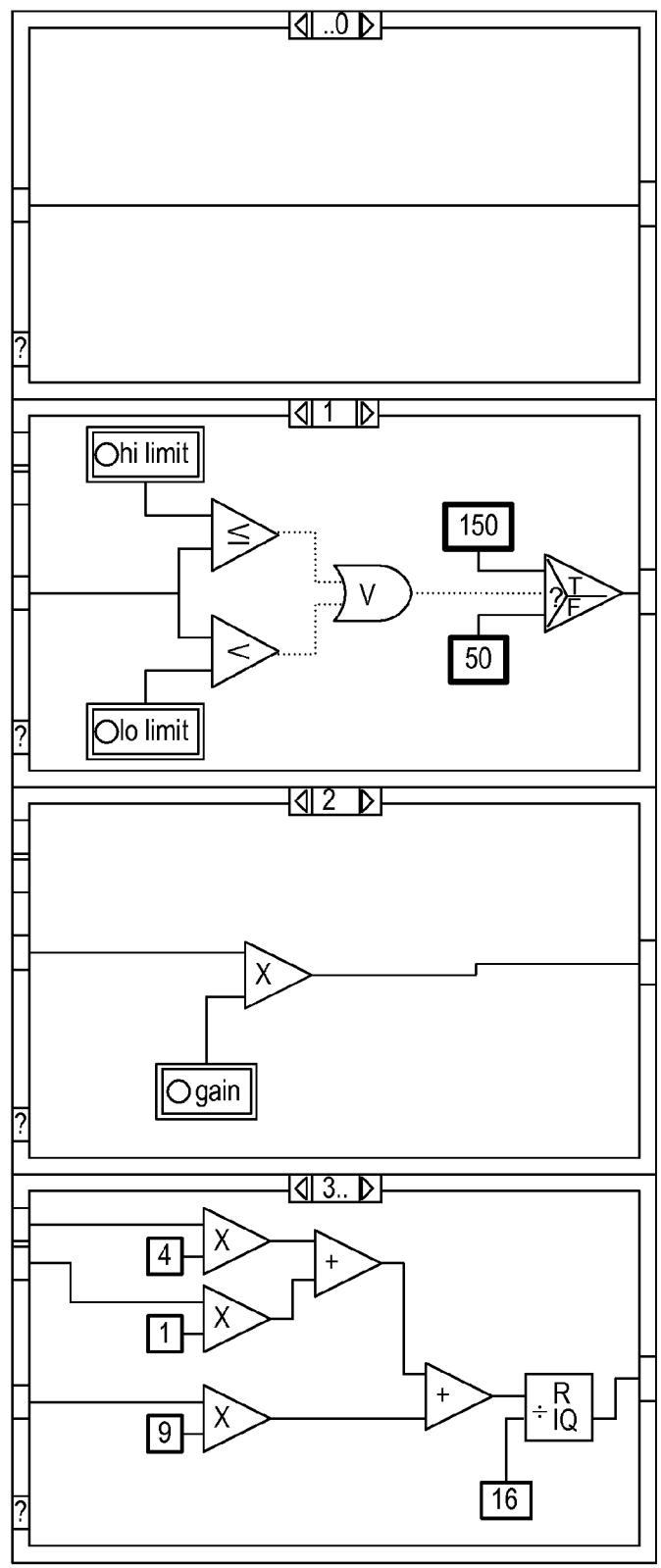

FIGS. 17-19: Example of Converting a Graphical Program into a Hardware Implementation FIGS. 17-19 comprise a more detailed example illustrating operation of the present invention.

FIG. 17 illustrates an example graphical program (a LabVIEW diagram) which is converted into an FPGA implementation using the present invention. As shown, the graphical program comprises a plurality of interconnected nodes comprised in a While loop. As shown, the While loop includes shift register icons, represented by the down and up arrows at the left and right edges, respectively, of the While loop. A 0 constant positioned outside of the While loop is connected to the down arrow of the shift register at the left edge of the While loop.

The While loop includes a timer icon representing or signifying timing for the While loop. The timer icon includes inputs for period and phase. As shown, the timer icon receives a constant of 1000 for the period and receives a constant of 0 for the phase. In an alternate embodiment, the While loop includes input terminals which are configured to receive timing information, such as period and phase.

FIG. 18 illustrates the LabVIEW data structures created in response to or representing the diagram or graphical program of FIG. 17. The data structure diagram of FIG. 17 comprises a hierarchy of data structures corresponding to the diagram of FIG. 17. As shown, the LabVIEW data structure representation includes a top level diagram which includes a single signal connecting the 0 constant to the left hand shift register of the While loop. Thus the top level diagram includes only the constant (0) and the While loop.

The While loop includes a sub-diagram which further includes left and right shift register terms, the continue flag of the While loop, a plurality of constants, a timer including period and phase inputs, global variables setpoint and gain, sub-VIs a/d read and d/a write, and various function icons, e.g., scale, add, subtract, and multiply. Further, each of the objects in the diagram have terminals, and signals connect between these terminals.

FIG. 19 illustrates a circuit diagram representing the hardware description which is created in response to the data structures of FIG. 18. The circuit diagram of FIG. 19 implements the graphical program of FIG. 17. As shown, the CPU interface signals are bussed to the global variables. Although not shown in FIG. 19, the CPU interface signals are also provided to the sub-VIs a/d read and d/a write.

The While loop is essentially abstracted to a control circuit which receives the period and phase, and includes an external enable directing the top level diagram to execute, which starts the loop. The loop then provides a diagram enable (diag_enab) signal to start the loop and waits for a diagram done (diag_done) signal to signify completion of the loop, or the period to expire. Based on the value of the Continue flag, the loop provides a subsequent diag_enab signal or determines that the loop has finished and provides a Done signal to the top level diagram. Although not shown in FIG. 19, the loop control block also provides a diagram clear enable out (diag_clear enab_out) signal to every node in the sub-diagram of the While loop. Thus the loop control block outputs a diagram enable (diag_enab) signal that is fed to all of the starting nodes in the diagram within the While loop. The Done signals from these items are fed into an AND gate, whose output is provided to enable subsequent nodes.

The shift register includes a data in, a data out and an enable input which clocks the data in (din) to the data out (dout), and a load which clocks the initial value into the shift register.

The VHDL description corresponding to the example of FIGS. 17-19 is included as Appendix I, wherein the VHDL description was created using the present invention.

Component Library

The preferred embodiment of the present invention includes a component library that is used to aid in converting various primitives or nodes in a graphical program into a hardware description, such as a VHDL source file. The following provides two examples of VHDL components in this component library, these being components for a While loop and a multiplier primitive.

1. While Loop Component

The following comprises a VHDL component referred to as whileloop.vhd that the present invention uses when a While loop appears on a graphical program or diagram. Whileloop.vhd shows how a While loop in a graphical program is mapped to a state machine in hardware. It is noted that other control structures such as a "For loop" are similar. Whileloop.vhd is as follows:

```vhdl
library ieee;
use ieee.std_logic_1164.all;
entity whileloop is
    port(
        clk,
        enable_in,      -- start loop execution
        clr_enable_out  -- reset loop execution
            : in std_logic;
        diag_enable,       -- start contained diagram execution
        diag_clr_enable_out -- reset contained diagram execution
            : out std_logic;
        diag_done,      -- contained diagram finished
        continue        -- iteration enabled
            : in std_logic;
        enable_out      -- looping complete
            : out std_logic
    );
end whileloop;
architecture rtl of whileloop is
    type state_t is (idle_st, -- reset state
                     test_st, -- check for loop completion
                     calc_st, -- enable diagram execution
                     end_st   -- assert enable_out
                    );
    signal nstate,state : state_t;
begin
    process(state,enable_in,clr_enable_out,diag_done,continue)
    begin
        diag_clr_enable_out <= '0';
        diag_enable <= '0';
        enable_out <= '0';
        case state is
            when idle_st =>
                diag_clr_enable_out <= '1';
                if enable_in='1' then
                    nstate <= test_st;
                else
                    nstate <=idle_st;
                end if;
            when test_st =>
                diag_clr_enable_out <= '1';
                if continue='1' then
                    nstate <= calc_st;
                else
                    nstate <= end_st;
                end if;
            when calc_st =>
                diag_enable <= '1';
                if diag_done='1' then
                    nstate <= test_st;
                else
                    nstate <= calc_st;
                end if;
            when end_st =>
                enable_out <= '1';
                nstate <= end_st;
        end case;
        -- Because it appears at the end of the process, this test
        -- overrides any previous assignments to nstate
        if clr_enable_out='1' then
            nstate <= idle_st;
        end if;
    end process;
    process(clk)
    begin
        if clk'event and clk='1' then
            state <= nstate;
        end if;
    end process;
end rtl;
```

2. Multiplier Primitive Component

The following comprises a VHDL component referred to as prim_multiply_16.vhd that the present invention uses when a multiplier primitive appears on a graphical program or diagram. By following the path from enable_in to enable_out, it can be seen how the self-timed logic works—each component asserts enable_out when the data output is valid. Other primitives like "add" or "less than" operate in a similar manner. Prim_multiply_16.vhd is as follows:

```vhdl
library ieee;
use ieee.std_logic_1164.all;
entity prim_multiply_16 is
    port(
        clk : in std_logic;
        enable_in : in std_logic;
        clr_enable_out : in std_logic;
        x_y : out std_logic_vector(15 downto 0);
        x : in std_logic_vector(15 downto 0);
        y : in std_logic_vector(15 downto 0);
        enable_out : out std_logic
    );
end prim_multiply_16;
architecture altera of prim_multiply_16 is
COMPONENT lpm_mult
    GENERIC (LPM_WIDTHA: POSITIVE;
             LPM_WIDTHB: POSITIVE;
             LPM_WIDTHS: POSITIVE;
             LPM_WIDTHP: POSITIVE;
             LPM_REPRESENTATION: STRING := "UNSIGNED";
             LPM_PIPELINE: INTEGER := 0;
             LPM_TYPE: STRING := "L_MULT"
            );
    PORT (dataa: IN STD_LOGIC_VECTOR(LPM_WIDTHA-1 DOWNTO 0);
          datab: IN STD_LOGIC_VECTOR(LPM_WIDTHB-1 DOWNTO 0);
          aclr: IN STD_LOGIC := '0';
          clock: IN STD_LOGIC := '0';
          sum: IN STD_LOGIC_VECTOR(LPM_WIDTHS-1 DOWNTO 0) := (OTHERS => '0');
          result: OUT STD_LOGIC_VECTOR(LPM_WIDTHP-1 DOWNTO 0));
END COMPONENT;
    signal 1_x,1_y : std_logic_vector(15 downto 0);
    signal 1_xy : std_logic_vector(31 downto 0);
    signal 1_enable_in : std_logic;
begin
    -- synchronize the incoming and outgoing data to guarantee
    -- a registered path on data through the multiplier
    -- register enable_out so it won't assert before data is
    -- available.
    process(clk)
    begin
        if clk'event and clk='1' then
            if clr_enable_out-'1' then
                enable_out <= '0';
                1_enable in <= '0';
            else
                enable_out <= 1_enable in;
                1_enable_in <= enable in;
            end if;
            1_x <= x;
            1_y <= y;
            x_y <= 1_xy(15 downto 0);
        end if;
    end process;
    gainx: lpm_mult
        GENERIC map(
            LPM_WIDTHA => 16,
            LPM_WIDTHB => 16,
            LPM_WIDTHS => 1,
            LPM_WIDTHP => 32,
            LPM_REPRESENTATION => "UNSIGNED",
            LPM_PIPELINE => 0
        )
        PORT map(
            dataa => 1_x,
            datab => 1_y,
            result => 1_xy
        );
end altera;
```

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A computer-implemented method for configuring an instrument to perform a measurement function, wherein the instrument includes a programmable hardware element, the method comprising:
   creating a block diagram, wherein the block diagram implements the measurement function;
   wherein the block diagram comprises a plurality of nodes, wherein at least a subset of the plurality of nodes are connected to indicate data flow among the at least a subset of the plurality of nodes, wherein a first node of the plurality of nodes specifies control flow of data among one or more of the plurality of nodes;
   generating a hardware description based on the block diagram, wherein the hardware description describes a hardware implementation of the block diagram;
   configuring the programmable hardware element in the instrument utilizing the hardware description, wherein after said configuring the programmable hardware element implements a hardware implementation of the block diagram;
   wherein the programmable hardware element in the instrument is operable to perform the measurement function on a received signal.

2. The method of claim 1,
   wherein the instrument comprises an image acquisition device, and wherein the image acquisition device comprises the programmable hardware element;
   wherein the block diagram specifies an image processing function;
   wherein the method further comprises:
      acquiring an image of an object and storing the image; and
      the programmable hardware element in the image acquisition device performing the image processing function on the image.

3. The method of claim 2, wherein the programmable hardware element performing the image processing function comprises:
   the programmable hardware element in the image acquisition device determining characteristics of the image after performing the image processing function; and
   the programmable hardware element in the image acquisition device performing an operation based on the determined characteristics of the image.

4. The method of claim 1, wherein the instrument comprises a smart camera, and wherein the smart camera comprises the programmable hardware element;
   wherein the method further comprises:
      the smart camera acquiring and storing an image of an object; and
      the programmable hardware element in the smart camera performing an image processing function on the image.

5. The method of claim 4, wherein the programmable hardware element performing the image processing function comprises:
   the programmable hardware element in the smart camera determining characteristics of the image after performing the image processing function; and
   the programmable hardware element in the smart camera performing an operation based on the determined characteristics of the image.

6. The method of claim 1,
   wherein the instrument comprises a smart sensor, and wherein the smart sensor comprises the programmable hardware element;
   wherein the method further comprises:
      the smart sensor acquiring a signal from the external source; and
      the programmable hardware element in the smart sensor performing the measurement function on the signal.

7. The method of claim 6, wherein the smart sensor is one of a temperature sensor, pressure sensor, camera, microphone, flow sensor, position sensor, velocity sensor, acceleration sensor, vibration sensor, electromagnetic sensor, optical sensor, radiation sensor, or environment sensor.

8. The method of claim 1,
   wherein the instrument comprises a fieldbus device, and wherein the fieldbus device comprises the programmable hardware element;
   wherein the method further comprises:
      the fieldbus device acquiring a signal from an external source; and
      the programmable hardware element performing the measurement function on the signal.

9. The method of claim 1,
   wherein the instrument comprises a programmable logic controller (PLC), and wherein the PLC comprises the programmable hardware element;
   wherein the method further comprises:
      the PLC acquiring a signal from an external source; and
      the programmable hardware element in the PLC performing the measurement function on the signal.

10. The method of claim 1,
   wherein the instrument comprises a computer-based instrument, wherein the computer-based instrument is configured as a card inserted into a slot of a computer system, and wherein the computer-based instrument comprises the programmable hardware element;
   wherein the method further comprises:
      the computer-based instrument acquiring a signal from an external source; and
      the programmable hardware element in the computer-based instrument performing the measurement function on the signal.

11. The method of claim 1,
   wherein the block diagram has an associated user interface portion;
   the method further comprising:
      presenting the user interface portion on a display during the programmable hardware element performing the measurement function on the received signal.

12. The method of claim 11,
   wherein the user interface portion operates as a front panel for the instrument;
   the method further comprising:
      receiving user input to the user interface portion on the display to control the instrument during the programmable hardware element in the instrument performing the measurement function on the received signal.

13. The method of claim 11,
   wherein the user interface portion includes one or more user interface objects;
   wherein said generating includes incorporating a register in the hardware description for at least one of the user interface objects;

wherein the programmable hardware element in the instrument performing the measurement function on the received signal comprises accessing the register on the programmable hardware element to affect one of said user interface objects.

14. The method of claim 11, further comprising:
compiling the user interface portion into executable code for execution by a processor and storing the executable code in a memory;
the processor executing the executable code from the memory to present the user interface portion on the display during the programmable hardware element in the instrument executing to perform the measurement function on the signal.

15. The method of claim 14, wherein the instrument includes the processor and the memory.

16. The method of claim 14, wherein the instrument is coupled to a computer system, wherein the computer system includes the processor and the memory.

17. The method of claim 1, wherein the instrument further includes timer/counter logic, the method further comprising:
the timer/counter logic performing one of timing/counting operations during the programmable hardware element in the instrument performing the measurement function on the received signal.

18. The method of claim 1, further comprising:
the programmable hardware element performing the measurement function on the received signal; and
the programmable hardware element performing a process control function using the signal.

19. The method of claim 1, further comprising:
converting the hardware description into a net list; and
compiling the net list format into a hardware program file;
wherein said configuring the programmable hardware element includes downloading the hardware program file to the programmable hardware element to configure the programmable hardware element.

20. The method of claim 19, wherein said converting the hardware description into a net list includes:
utilizing at least one function block from a library of pre-compiled function blocks; and
utilizing hardware target specific information.

21. The method of claim 1, wherein said creating the block diagram includes:
arranging on the screen a plurality of nodes comprising the block diagram and interconnecting the plurality of nodes;
creating and storing data structures which represent the block diagram in response to said arranging and said interconnecting;
wherein said generating the hardware description comprises:
traversing the data structures;
converting the data structures into a hardware description format in response to said traversing.

22. The method of claim 1,
wherein said generating the hardware description comprises converting each of said nodes into a hardware description format.

23. The method of claim 1,
wherein, for the first node, said generating comprises:
determining inputs and outputs to/from the first node;
generating a hardware description of a control block which performs the control function indicated by the first node;
traversing input dependencies of the first node;
creating a hardware description of an AND gate, including listing connections of said input dependencies of the first node to said AND gate.

24. The method of claim 1, wherein a first portion of the block diagram is converted into a hardware description;
the method further comprising:
compiling a second portion of the block diagram into machine code for execution by the processor.

25. The method of claim 1, wherein the instrument includes a non-volatile memory coupled to the programmable hardware element, the method further comprising:
storing the hardware description into the non-volatile memory;
wherein said configuring the programmable hardware element comprises transferring the hardware description from the non-volatile memory to the programmable hardware element to produce the programmable hardware element.

26. The method of claim 1, further comprising:
the instrument acquiring a signal from an external source after said configuring;
the programmable hardware element in the instrument executing to perform the measurement function on the signal.

27. The method of claim 1,
wherein the block diagram is executable by a processor to perform the measurement function.

28. The method of claim 1,
wherein the first node indicates iteration for the one or more of the plurality of nodes in the block diagram.

29. The method of claim 1,
wherein the first node indicates looping for the one or more of the plurality of nodes in the block diagram.

30. The method of claim 1,
wherein the first node indicates conditional branching for the one or more of the plurality of nodes in the block diagram.

31. The method of claim 1,
wherein the first node indicates a first portion of the block diagram, wherein the first node indicates one of iteration, looping or conditional branching for the first portion of the block diagram.

32. The method of claim 1,
wherein the first node includes an interior portion, wherein a first portion of the block diagram is comprised in the interior portion, and wherein the first portion of the block diagram comprised in the interior portion of the first node execute according to control flow as indicated by the first node.

33. The method of claim 1, wherein said generating includes examining one or more first node parameters associated with the first node, and wherein said generating uses the one or more first node parameters in generating the hardware description.

34. The method of claim 33, wherein the first node is one of an iteration node or a looping node;
wherein the first node includes at least one of a period parameter and a phase delay parameter, wherein the period parameter indicates a period of execution for cycles of the first node, and wherein the phase delay parameter indicates a phase delay of cycles of the first node.

35. The method of claim 1, wherein the first node is an iteration node, wherein the iteration node indicates iteration of the one or more of the plurality of nodes in the block diagram for a plurality of times;

wherein the iteration node includes an iteration number which indicates a number of iterations for the block diagram; and wherein said generating uses the iteration number in generating the hardware description.

36. The method of claim 1, wherein the first node is a looping node, wherein the looping node indicates looping of the one or more of the plurality of nodes in the block diagram for a plurality of times;

wherein the looping node includes a loop condition which indicates a number of executions for the block diagram; and wherein said generating uses the loop condition in generating the hardware description.

37. A measurement system, comprising:

a computer system comprising a processor, memory and a display;

wherein the memory stores a block diagram, wherein the block diagram implements a measurement function, wherein the block diagram comprises a plurality of interconnected nodes which visually indicate functionality of the block diagram, wherein at least a subset of the plurality of nodes are connected to indicate data flow among the at least a subset of the plurality of nodes, wherein a first node of the plurality of nodes specifies control flow of data among one or more of the plurality of nodes;

wherein the memory also stores a software program which is executable to generate a hardware description based on the block diagram, wherein the hardware description describes a hardware implementation of the block diagram; and an instrument coupled to the computer system, wherein the instrument includes:

an input for acquiring a signal from an external source; and a programmable hardware element coupled to the input, wherein the programmable hardware element in the instrument is configurable utilizing the hardware description, wherein after being configured the programmable hardware element implements a hardware implementation of the block diagram, and wherein the programmable hardware element in the instrument is operable to perform the measurement function on an acquired signal.

38. The measurement system of claim 37, wherein the instrument comprises an image acquisition device, and wherein the image acquisition device comprises the programmable hardware element;

wherein the image acquisition device is operable to acquire an image of an object, and wherein the programmable hardware element in the image acquisition device is operable to perform an image processing function on the image.

39. The measurement system of claim 37, wherein the instrument comprises a smart camera, and wherein the smart camera comprises the programmable hardware element;

wherein the smart camera is operable to acquire an image of an object and store the image; and wherein the programmable hardware element in the smart camera is operable to perform an image processing function on the image.

40. The measurement system of claim 37, wherein the instrument comprises a smart sensor, and wherein the smart sensor comprises the programmable hardware element;

wherein the smart sensor is operable to acquire a signal from an external source; and wherein the programmable hardware element in the smart sensor is operable to perform the measurement function on the signal.

41. The measurement system of claim 37, wherein the instrument comprises a fieldbus device, and wherein the fieldbus device comprises the programmable hardware element;

wherein the fieldbus device is operable to acquire the signal from the external source; and wherein the programmable hardware element in the fieldbus device is operable to perform the measurement function on the signal.

42. The measurement system of claim 37, wherein the instrument comprises a programmable logic controller (PLC), and wherein the PLC comprises the programmable hardware element;

wherein the PLC is operable to acquire the signal from the external source; and wherein the programmable hardware element in the PLC is operable to perform the measurement function on the signal.

43. The measurement system of claim 37, wherein the instrument comprises a computer-based instrument, wherein the computer-based instrument is configured as a card inserted into a slot of a computer system, and wherein the computer-based instrument comprises the programmable hardware element;

wherein the computer-based instrument is operable to acquire the signal from an external source; and wherein the programmable hardware element in the computer-based instrument is operable to perform the measurement function on the signal.

44. The measurement system of claim 37, wherein the block diagram has an associated user interface;

wherein the user interface portion is operable to be presented on a display during the programmable hardware element in the instrument executing to perform the measurement function on the signal.

45. The measurement system of claim 44, wherein the user interface operates as a front panel for the instrument;

wherein the user interface is operable to receive user input to control the instrument while the programmable hardware element in the instrument executes to perform the measurement function on the signal.

46. The measurement system of claim 44, wherein the user interface includes one or more user interface objects;

wherein, in generating a hardware description based on the block diagram, the software program is executable to incorporate a register in the hardware description for at least one of the user interface objects;

wherein the programmable hardware element in the instrument is operable to access a register on the programmable hardware element to affect one of said user interface objects.

47. The measurement system of claim 37, wherein the programmable hardware element in the instrument executes to perform a process control function using the signal.

48. The measurement system of claim 37, wherein the programmable hardware element comprises a field programmable gate array (FPGA).

49. The measurement system of claim 37, wherein the instrument includes a non-volatile memory coupled to the programmable hardware element;

wherein the non-volatile memory is operable to store the hardware description;

wherein the non-volatile memory is operable to transfer the hardware description to the programmable hardware element to produce the programmable hardware element.

50. The measurement system of claim 37, wherein the block diagram is executable by the processor to perform the measurement function.

51. The measurement system of claim 37, wherein the first node indicates iteration for the one or more of the plurality of nodes in the block diagram.

52. The measurement system of claim 37, wherein the first node indicates looping for the one or more of the plurality of nodes in the block diagram.

53. The measurement system of claim 37, wherein the first node indicates conditional branching for the one or more of the plurality of nodes in the block diagram.

54. The measurement system of claim 37, wherein the first node indicates a first portion of the block diagram, wherein the first node indicates one of iteration, looping or conditional branching for the first portion of the block diagram.

55. The measurement system of claim 37, wherein the first node includes an interior portion, wherein a first portion of the block diagram is comprised in the interior portion, and wherein the first portion of the block diagram comprised in the interior portion of the first node execute according to control flow as indicated by the first node.

56. The measurement system of claim 37, wherein said generating includes examining one or more first node parameters associated with the first node, and wherein said generating uses the one or more first node parameters in generating the hardware description.

57. The measurement system of claim 56, wherein the first node is one of an iteration node or a looping node;

wherein the first node includes at least one of a period parameter and a phase delay parameter, wherein the period parameter indicates a period of execution for cycles of the first node, and wherein the phase delay parameter indicates a phase delay of cycles of the first node.

58. The measurement system of claim 37, wherein the first node is an iteration node, wherein the iteration node indicates iteration of the one or more of the plurality of nodes in the block diagram for a plurality of times;

wherein the iteration node includes an iteration number which indicates a number of iterations for the block diagram; and wherein said generating uses the iteration number in generating the hardware description.

59. The measurement system of claim 37, wherein the first node is a looping node, wherein the looping node indicates looping of the one or more of the plurality of nodes in the block diagram for a plurality of times;

wherein the looping node includes a loop condition which indicates a number of executions for the block diagram; and wherein said generating uses the loop condition in generating the hardware description.

* * * * *